US012579098B2

(12) United States Patent
Munday et al.

(10) Patent No.: US 12,579,098 B2
(45) Date of Patent: Mar. 17, 2026

(54) METHODS AND APPARATUS TO PROCESS WEB-SCALE GRAPHS

(71) Applicant: Intel Corporation, Santa Clara, CA (US)

(72) Inventors: Tarjinder Singh Munday, Bengaluru (IN); Vidhya Thyagarajan, Bengaluru (IN); Santebennur Ramakrishnachar Sridhar, Bengaluru (IN); Jagan Jeyaraj, Bengaluru (IN); C Ranga Sumiran, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 17/710,877

(22) Filed: Mar. 31, 2022

(65) Prior Publication Data

US 2022/0222204 A1    Jul. 14, 2022

(51) Int. Cl.
*G06F 15/80*        (2006.01)

(52) U.S. Cl.
CPC ................................. *G06F 15/8007* (2013.01)

(58) Field of Classification Search
None
See application file for complete search history.

(56) References Cited

U.S. PATENT DOCUMENTS

| | | | |
|---|---|---|---|
| 2008/0155119 A1* | 6/2008 | Imamura | H04L 45/00 |
| | | | 709/241 |
| 2010/0306216 A1* | 12/2010 | Andersen | G06F 16/9024 |
| | | | 707/769 |
| 2012/0166771 A1* | 6/2012 | Ringseth | G06F 8/31 |
| | | | 712/E9.016 |
| 2013/0145031 A1* | 6/2013 | Fawcett | H04L 67/1023 |
| | | | 709/226 |
| 2017/0004089 A1* | 1/2017 | Clemons | G06F 12/0893 |
| 2019/0379396 A1* | 12/2019 | Bajic | G06F 17/16 |
| 2020/0192650 A1* | 6/2020 | Santosuosso | G06F 9/5072 |
| 2021/0334106 A1* | 10/2021 | Etsion | G06F 15/7867 |

(Continued)

OTHER PUBLICATIONS

Alvarez-Gonzalez, N. et al., Inductive Graph Embeddings through Locality Encodings, 2020, arXiv,29 pages (Year: 2020).*

(Continued)

*Primary Examiner* — Eric Coleman
(74) *Attorney, Agent, or Firm* — Hanley, Flight & Zimmerman, LLC

(57)        ABSTRACT

Methods, apparatus, systems, and articles of manufacture to process web-scale graphs are disclosed. An example apparatus comprises: at least one memory; instructions; and processor circuitry to execute the instructions to: retrieve a compute based tile (CBT) from a first external memory, the CBT to include source and destination nodes of a graph; assign a stripe of the CBT to a single instruction multiple data compute unit, the stripe including a first tile and a second tile, the first tile to include first destination nodes and first source nodes, the second tile to include the first destination nodes and second source nodes; retrieve source node embeddings of the stripe based on a node identifier to source node embedding lookup; and provide the source node embeddings to the single instruction multiple data compute unit.

21 Claims, 19 Drawing Sheets

100 ⇢

(56)                 References Cited

U.S. PATENT DOCUMENTS

2022/0156322 A1 *   5/2022   Singh ................. G06F 16/9024

OTHER PUBLICATIONS

Sohrabizadeh, A. et al., SPA-GCN: Efficient and Flexible GCN Accelerator with an Application for Graph Similarity Computation 2021, arXiv, 12 pages. (Year: 2021).*

Meusel, R. The Graph Structure in the Web-Analyzed on Different Aggregation Levels 2015, Journal of Web Science, pp. 33-37. (Year: 2015).*

Zeng, K, et al., A Distributed Graph Engine for Web Scale RDF Data, 2013, Proceedings of the VLDB Endowment, pp. 265-276. (Year: 2013).*

Challapalle , N et al., GaaS-X: Graph Analytics Acceleratory Supporting Sparse Data Representation using Crossbar Architectures, 2020, IEEE, pp. 433-445. (Year: 2020).*

Peng, Z. et al., GraphPhi: Efficient Parallel Graph Processing on Emerging throughput-oriented Architectures, 2018, ACM, 14 pages. (Year: 2018).*

* cited by examiner

Figure 9:
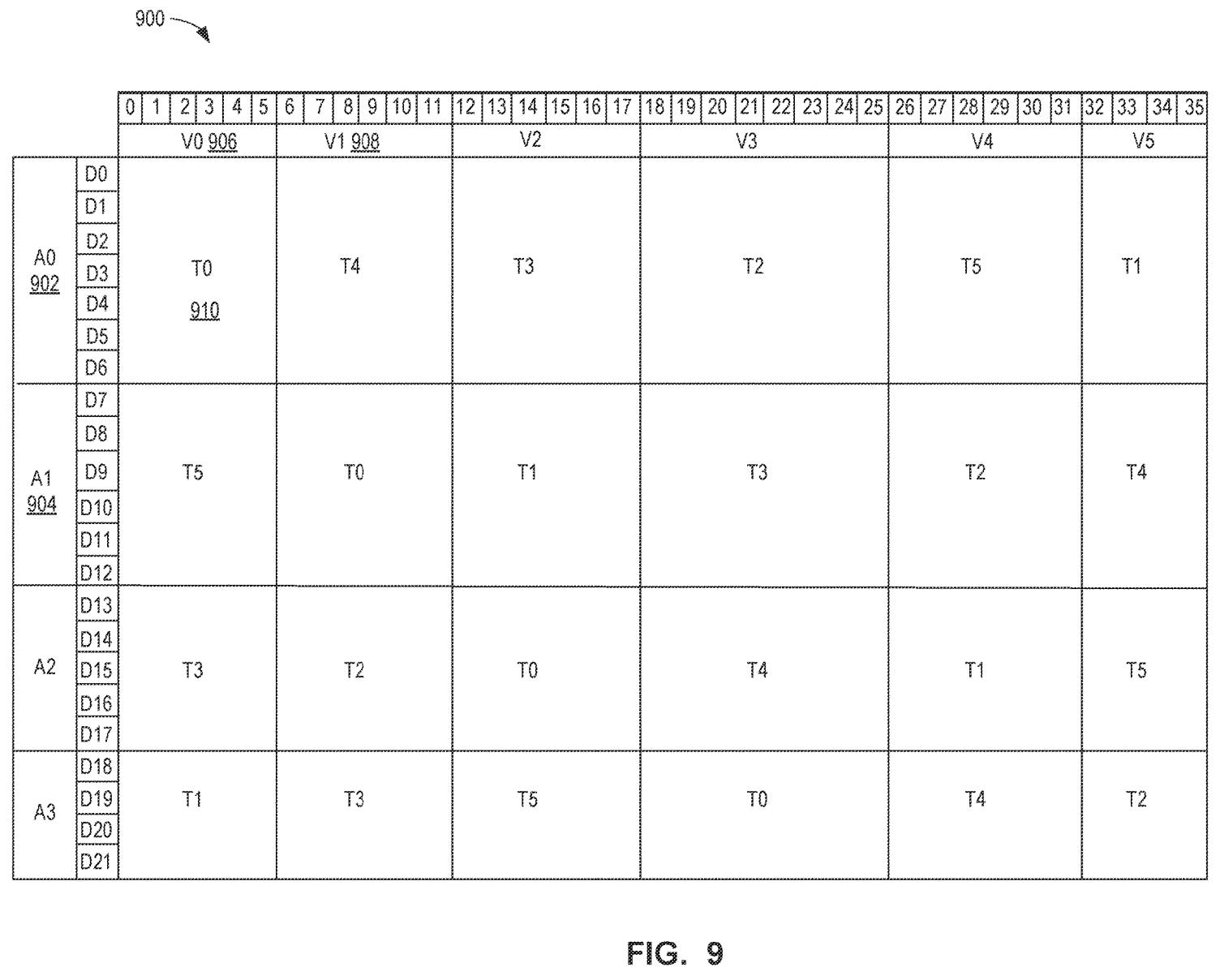

|  | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|---|
|  | | V0 906 | | | | | | V1 908 | | | | | | V2 | | | | | | V3 | | | | | | V4 | | | | | | V5 | | | | |
| A0 902 | D0 D1 D2 D3 D4 D5 D6 | T0 910 | | | | | | T4 | | | | | | T3 | | | | | | T2 | | | | | | T5 | | | | | | T1 | | | | |
| A1 904 | D7 D8 D9 D10 D11 D12 | T5 | | | | | | T0 | | | | | | T1 | | | | | | T3 | | | | | | T2 | | | | | | T4 | | | | |
| A2 | D13 D14 D15 D16 D17 | T3 | | | | | | T2 | | | | | | T0 | | | | | | T4 | | | | | | T1 | | | | | | T5 | | | | |
| A3 | D18 D19 D20 D21 | T1 | | | | | | T3 | | | | | | T5 | | | | | | T0 | | | | | | T4 | | | | | | T2 | | | | |

LOAD SOURCE NODE DATA

RETRIEVE SOURCE NODE ID(S)    1202

DETERMINE EMBEDDING ADDRESS BASED ON A NODE ID TO EMBEDDING LOOK UP    1204

FETCH NODE EMBEDDING DATA VIA DESCRIPTOR BASED DIRECT MEMORY ACCESS    1206

STORE EMBEDDING DATA IN BANKED EMBEDDING BUFFER    1208

RETURN TO BLOCK 1106

| DATASET | HARDWARE / SOFTWARE | EFFICIENCY (%) | EFFICIENCY RATIO |
|---|---|---|---|
| FIRST NETWORK 230 THOUSAND NODES 114 MILLION EDGES | SYSTEM 100 (1 GHZ) | 85.12 | 4.58 |
| | CONVENTIONAL CPU (2.2 GHZ) | 18.57 | |
| SECOND NETWORK 2.4 MILLION NODES 124 MILLION EDGES | SYSTEM 100 (1 GHZ) | 69.52 | 87.39 |
| | CONVENTIONAL CPU (2.2 GHZ) | 0.8 | |
| THIRD NETWORK 1M NODES 6M EDGES | SYSTEM 100 (1 GHZ) | 67.81 | 62.05 |
| | CONVENTIONAL CPU (2.2 GHZ) | 1.09 | |
| FOURTH NETWORK 65 MILLION NODES 1.8 BILLION EDGES | SYSTEM 100 (1 GHZ) | 77.85 | 46.92 |
| | CONVENTIONAL CPU (2.2 GHZ) | 1.66 | |

METHODS AND APPARATUS TO PROCESS WEB-SCALE GRAPHS

FIELD OF THE DISCLOSURE

This disclosure relates generally to computer hardware and software and, more particularly, to methods and apparatus to process web-scale graphs.

BACKGROUND

Graph embeddings are vector representations of graphs that capture graph topology, relationships between nodes, and other features in vector form. Graph embeddings may also be referred to as node embeddings. Such vector representations may be used as input to machine learning models.

BRIEF DESCRIPTION OF THE DRAWINGS

FIG. 9 is a matrix of source nodes and destination nodes tiled into segments.

FIG. 15 is a table illustrating efficiency improvements of example systems disclosed herein.

Figure 1:
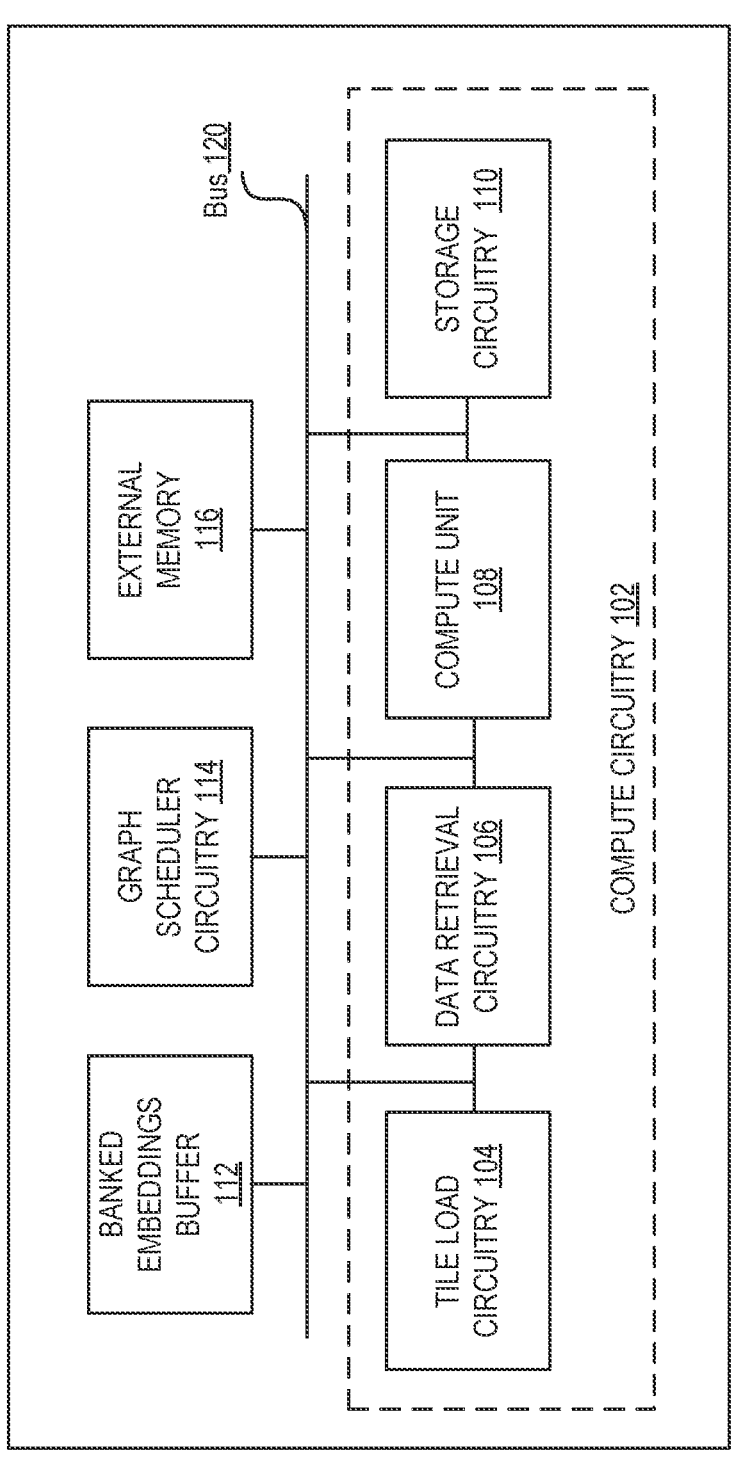
FIG. 1 is a block diagram of an example architecture to process web-scale graphs.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Computer architecture has evolved over time to accommodate changes in data. Specifically, data workloads have changed from scalar data (e.g., processed on CPUs), to vector data (e.g., processed on DSPs), to matrix data (e.g., processed on GPUs), to tensor data (e.g., processed on TPUs). Yet, in each of these cases, data is contained to an N-dimensional space.

Graphs do not natively map to N-dimensional space, and are associated with sparse and irregular data movement. Such characteristics lead to inefficient execution on conventional architectures. While conventional computer hardware (e.g., CPUs, DSPs, GPUs, and TPUs) performs well with dense data (e.g., vectors), such hardware is inefficient when processing web-scale graphs.

Conventional architectures fail to scale with the size of web-scale graph data. Furthermore, conventional architectures do not account for web-scale graph sparsity and uneven node degree. For example, a popular celebrity may have exponentially more connections than an average user of a social media website.

Conventional architectures do not account for irregular memory accesses and uneven compute core schedules when processing web-scale graphs. For example, compute units in a conventional multi-core machine are not busy every cycle when processing web-scale graphs. Graph workloads are often highly memory bound, and scaling of compute on conventional architectures is often impractical. Conventional architectures (e.g., CPU, GPU, TPU, etc.) do not adequately address the above problems. Furthermore, conventional software-based optimization techniques fail to remedy the deficiencies noted above.

Example processes, machines, and manufactures disclosed herein process web-scale graphs. Examples disclosed herein provide technological solutions to the problems described above with hardware and software architectures that can efficiently manage and perform computations on large, sparse graphs.

In some examples, graph connectivity info is broken into packets called compute balanced tiles (CBTs). In some examples, CBTs are stored in external memory (e.g., off-chip memory, DRAM, etc.). CBTs may include graph connectivity information, node identifications (IDs), and weights associated with the connectivity information. In some examples, node information (e.g., node embeddings) are stored in external memory. In some examples, a look-up table including a node ID to address mapping facilitates retrieval of the node embeddings from external memory.

In some examples, source nodes of a CBT are streamed from external memory to a local memory architecture (e.g., a banked embeddings buffer). In some examples, graph scheduler circuitry schedules retrieval of data from an example banked embeddings buffer and provides the data to specialized compute units described herein.

Some examples include a group of single instruction multiple data (SIMD) compute units that perform efficient matrix-vector operations. The compute units are configured such that input data can be accessed by each compute unit independently. Thus, the compute units can receive and perform computations on data in parallel.

Some examples include banked embedding buffers that receive node embeddings to be stored in banks of the banked embedding buffers for parallel access. The example banked embedding buffer allows flexible routing of source nodes to compute units and enable non-uniform data to be supplied to multiple compute units and/or compute clusters.

Some examples include graph scheduler circuitry that is associated with compute units and banked embedding buffers. Example graph scheduler circuitry efficiently distributes compute tasks to compute units despite the non-uniform nature of web-scale graphs. The graph scheduler circuitry maps source nodes to compute units to reduce idle cycles and improve compute efficiency.

The graph scheduler circuitry triggers compute units to begin computation on destination nodes. The compute unit(s) aggregate input data associated with the destination nodes until aggregation for the destination node is complete. Some example graph scheduler circuitry is configured for non-uniform data and allocates compute tasks to multiple compute units, resulting in improved compute efficiency when compared to conventional solutions. Some examples intersperse outlier nodes with inlier nodes to improve memory-bound operations.

Some examples include an expandable three-dimensional compute architecture (e.g., Cx for x-dimension, Cy for y-dimension, and Cz for z-dimension). In such examples, there may be Cz compute clusters, with compute clusters including Cy compute units. The Cy compute units may include SIMD compute architectures that operate on data of Cx width. Thus, although some examples described herein (e.g., in association with FIG. 1) only illustrate a single compute cluster (e.g., a compute cluster including compute circuitry, a banked embedding buffer, and graph scheduler circuitry) some example architectures may include multiple compute clusters interconnected by communication buses. In other words, the architectures described herein are scalable.

Some examples disclosed herein provide an $85x$ performance improvement when compared to conventional CPU/GPUs for graph workloads. Additionally, examples disclosed herein are low power and highly scalable.

FIG. 1 is a block diagram of an example architecture 100 to process web-scale graphs. The example architecture 100 includes example compute circuitry 102, example tile load circuitry 104, example data retrieval circuitry 106, an example compute unit 108, example storage circuitry 110, an example banked embedding buffer 112, example graph scheduler circuitry 114, example external memory 116, and an example bus 120.

The example architecture 100 includes the compute circuitry 102. The example compute circuitry 102 is single instruction multiple data (SIMD) compute circuitry that can, for example, load graph connectivity data and associated edge weights into the banked embedding buffer 112. The example compute circuitry 102 loads source node data into the banked embedding buffer 112 and performs multiply-add operations on source node data and graph connectivity data.

The example tile load circuitry 104 loads CBTs from memory. CBTs are comprised of portions of graphs that are pre-processed, banded, and sliced into units. The example architecture 100 operates on CBTs with a fixed number of source nodes (e.g., 8 source nodes) and a varying number of destination nodes. As described herein, a set of CBTs in a row belonging to a common range of destination nodes is a CBT stripe (SCBT). In some examples, SCBTs can be assigned to different clusters (Cz) of the architecture 100 for processing. SCBTs may be further divided into compute balanced stripes (SCUs) that can be provided to the compute unit 108. SCUs can also be assigned to different compute units of the architecture 100 for processing. CBTs and tiling techniques will be described in further detail in association with FIGS. 7 and 8.

The compute circuitry 102 performs operations on embeddings of source nodes connected to destination nodes. CBTs are formed such that large number of computations are possible for a single fetched source node embedding. In other words, CBT dimensions are selected so that a larger number of destination node results are computed for fewer source nodes. Additionally, high-degree nodes (e.g., resident source nodes, resident destination nodes) are handled according to operations described in further detail in association with FIGS. 7 and 8.

The example compute circuitry 102 includes the tile load circuitry 104. The example tile load circuitry 104 retrieves CBT tiles from the external memory 116. CBT tiles include source-destination connectivity information and may include edge weights. A CBT for a range of destination nodes is stored contiguously as a SCBT. In some examples, the tile load circuitry 104 identifies CBT boundaries in a stream of bytes, identifies all unique source nodes for a given CBT, and provides the unique source nodes to the data retrieval circuitry 106 that fetches source node embeddings.

The example compute circuitry 102 includes the example data retrieval circuitry 106. The example data retrieval circuitry 106 loads source node embeddings (e.g., retrieved by source node ID) from the external memory 116. A node identifier to embedding look-up is used to determine an embedding address in the external memory 116. Source node embedding data is fetched based on a descriptor-based direct memory access. The fetched source nodes are stored in the banked embedding buffer 112.

The example data retrieval circuitry 106 retrieves source node embeddings and accumulates the retrieved embeddings into a b-batch data. The b-batch data is provided to the compute unit 108. The example data retrieval circuitry 106 also retrieves connectivity and edge-weight data, and accumulates the retrieved embeddings into an a-batch data. In some examples, the a-batch data and the b-batch data are combined into a CBT batch data and provided to the compute unit 108.

The example compute unit 108 triggers compute when bank(s) of the banked embedding buffer 112 are filled (e.g., with node embeddings and connectivity/edge-weight information). The example compute unit 108 performs multiply add operations on a-batch and b-batch data (e.g., CBT batch data) retrieved from the data retrieval circuitry 106. The example compute unit 108 may then provide the results of the operations to the example storage circuitry 110. In some examples, the storage circuitry 110 may be external storage circuitry and located off-chip.

The compute circuitry 102 may utilize pipelining and operate in phases (e.g., four phases: load tile data, load source data, compute data, and store data). In some examples, the compute circuitry 102 may operate in more than four phases. For example, the load tile phase may be divided into two phases, a CBT boundary splitting phase and a source node identification phase.

The example banked embedding buffer 112 stores b-batch data that is provided to the example compute circuitry 102. The example banked embedding buffer 112 allows flexible routing of source nodes to compute units and enables non-uniform data to be supplied to multiple compute units and/or compute clusters. The example banked embeddings buffer 112 will be described further in association with FIG. 6.

The example architecture 100 includes the example graph scheduler circuitry 114. The example graph scheduler circuitry 114 assigns banks of the banked embedding buffer 112 to the compute unit 108 (or another compute unit of the compute circuitry 102) based on compute unit availability. The example graph scheduler circuitry 114 facilitates retrieval of node embedding data by the compute unit 108 without waiting for the banked embedding buffer 112, thereby avoiding inefficient accesses to static random access memory. The example graph scheduler circuitry 114 will be described in further detail in association with FIGS. 9-10.

The example architecture 100 includes the external memory 116. The example external memory is an off-chip memory. However, in some examples, local memory within the compute circuitry 102 may perform some or all of the functions of the external memory 116.

Figure 2A:
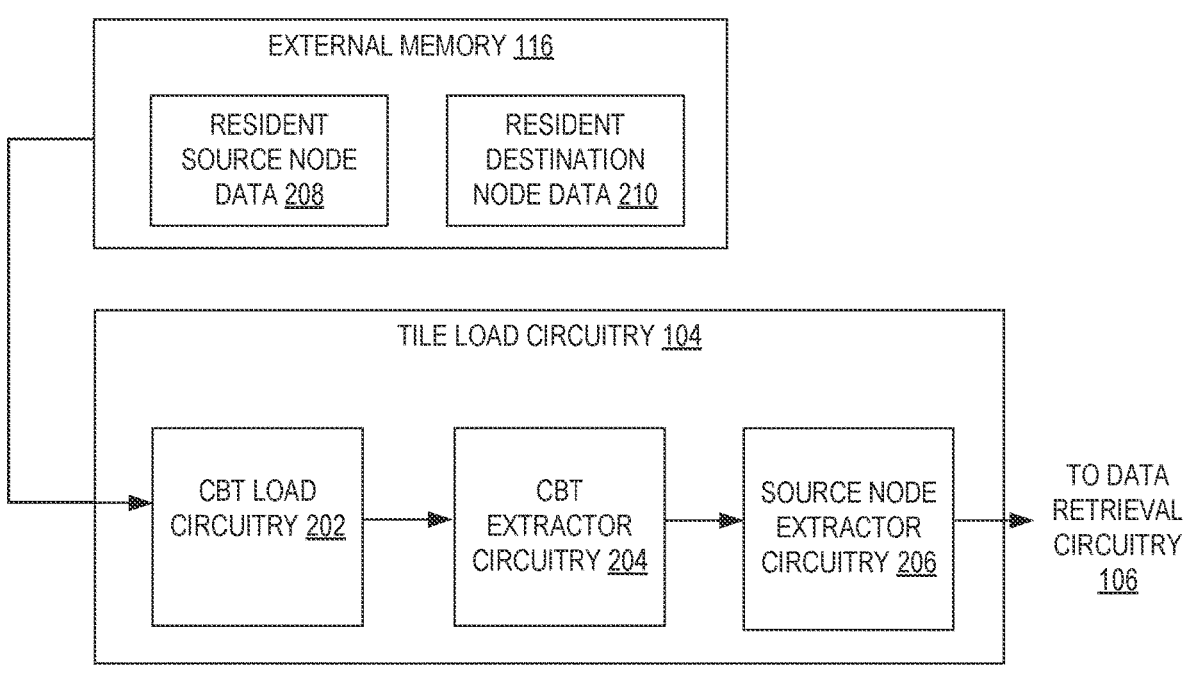
FIG. 2A is a block diagram of example tile load circuitry and external memory.

FIG. 2A is a block diagram of the example tile load circuitry 104 and the example external memory 116 of FIG. 1. The example tile load circuitry 104 includes example CBT load circuitry 202, example CBT extractor circuitry 204, and example source node extractor circuitry 206. The external memory 116 includes resident source node data 208 and resident destination node data 210.

The example tile load circuitry 104 loads (e.g., streams) CBT tiles including CBT stripes from the external memory 116. The CBT load circuitry 202 may include a buffer that temporarily stores the loaded CBT tiles in a first-in-first-out buffer, to be transferred to the CBT extractor circuitry 204.

The example CBT load circuitry 202 may also provide CBT data to the CBT extractor circuitry 204.

The CBT extractor circuitry 204 retrieves CBTs from the CBT load circuitry 202. In some examples, the CBT load circuitry 202 may load a stream of bytes including a plurality of CBT tiles. The CBT extractor circuitry 204 takes the stream of bytes and identifies boundaries between ones of the plurality of the CBT tiles. The CBT extractor circuitry 204 provides the CBT data and associated boundaries of the CBT tiles to the example source node extractor circuitry 206. The example source node extractor circuitry 206 identifies source nodes included in the CBT data provided by the CBT extractor circuitry 204, and provides information related to the source nodes to the data retrieval circuitry 106.

Figure 2B:
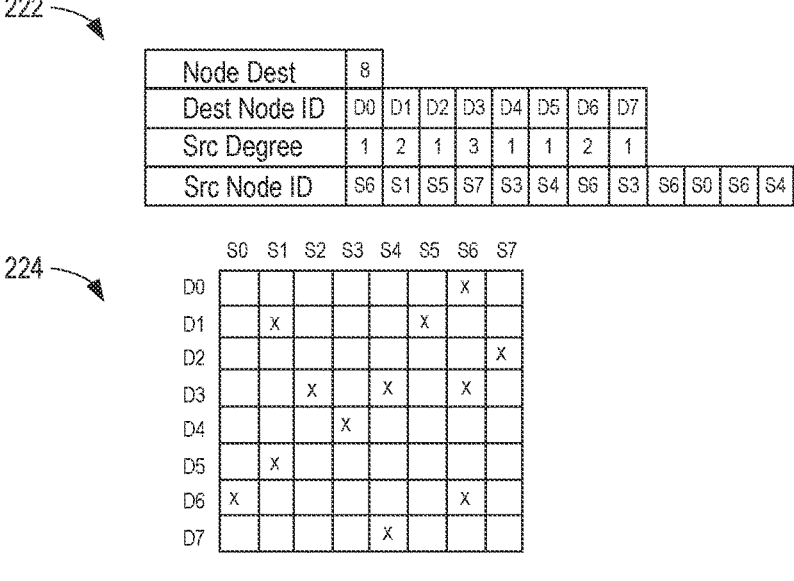
FIG. 2B is an illustration of example node connectivity data for the example architecture of FIG. 1.

FIG. 2B illustrates two example representations of an example CBT. As described above, a CBT includes information on source and destination nodes, as well as the interconnections between the source nodes and the destination nodes. The table 222 includes destination node descriptors, destination node IDs, and source node IDs. In some examples, the data in the table 222 may be serialized and transmitted to the example CBT load circuitry 202.

An adjacency matrix 224 of the table 222 includes source nodes (e.g., S0, S1) defining columns of the matrix 224, and destination nodes (e.g., D1, D2) defining rows of the matrix 224. Squares marked with an "X" indicate an interconnection between a source node and a destination node.

Figure 3:
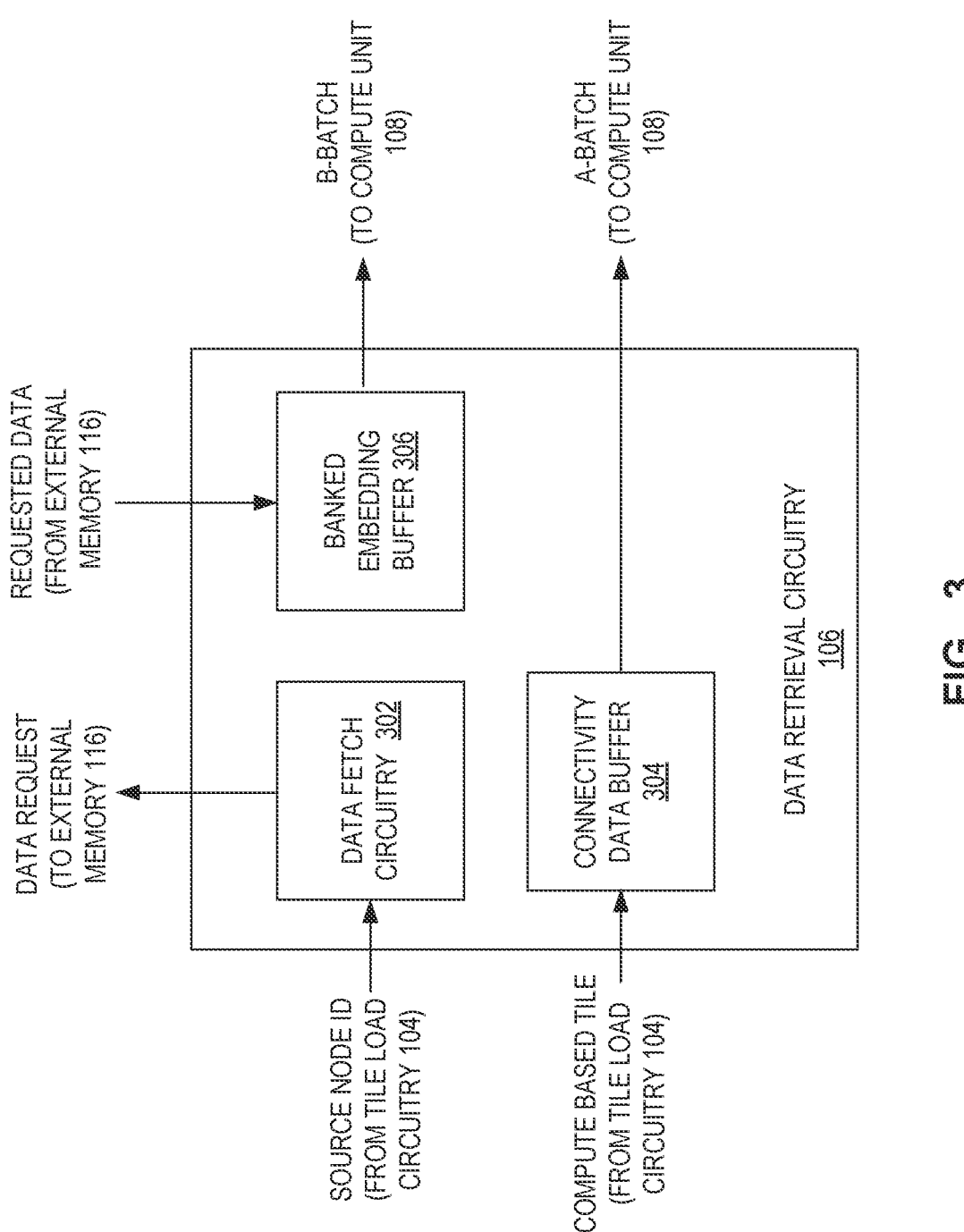
FIG. 3 is a block diagram of example data retrieval circuitry of the example architecture of FIG. 1.

FIG. 3 is a block diagram of the example data retrieval circuitry 106 of FIG. 1. The example data retrieval circuitry 106 includes data fetch circuitry 302, an example banked embedding buffer 306, and an example connectivity data buffer 304. In the example of FIG. 3, the example banked embedding buffer 306 is disposed within the example data retrieval circuitry 106, rather than as a separate unit as illustrated in the example of FIG. 1.

The example data fetch circuitry 302 requests embedding data for source IDs identified by the tile load circuitry 104. The example data fetch circuitry 302 locates information in the external memory 116 for a descriptor based direct memory access. The example data fetch circuitry 302 may associate source node IDs with corresponding source node embeddings (e.g., based on a hash table, a look-up table, etc.). The fetched data comprises the b-batch data that is provided to the compute unit 108.

In the example of FIG. 3, the example banked embedding buffer 306 is included as part of the data retrieval circuitry. The example banked embedding buffer 306 temporarily stores retrieved b-batch data until the compute unit 108 is available to operate on the retrieved b-batch data.

The example data retrieval circuitry 106 includes the example connectivity data buffer 304. The connectivity data buffer 304 may retrieve CBTs from the tile load circuitry 104. The connectivity data buffer 304 also stores the a-batch data while the b-batch data is being fetched. After the b-batch data retrieval is complete, and in response compute unit availability, the connectivity data buffer 304 provides the a-batch data to the compute unit 108.

Figure 4:
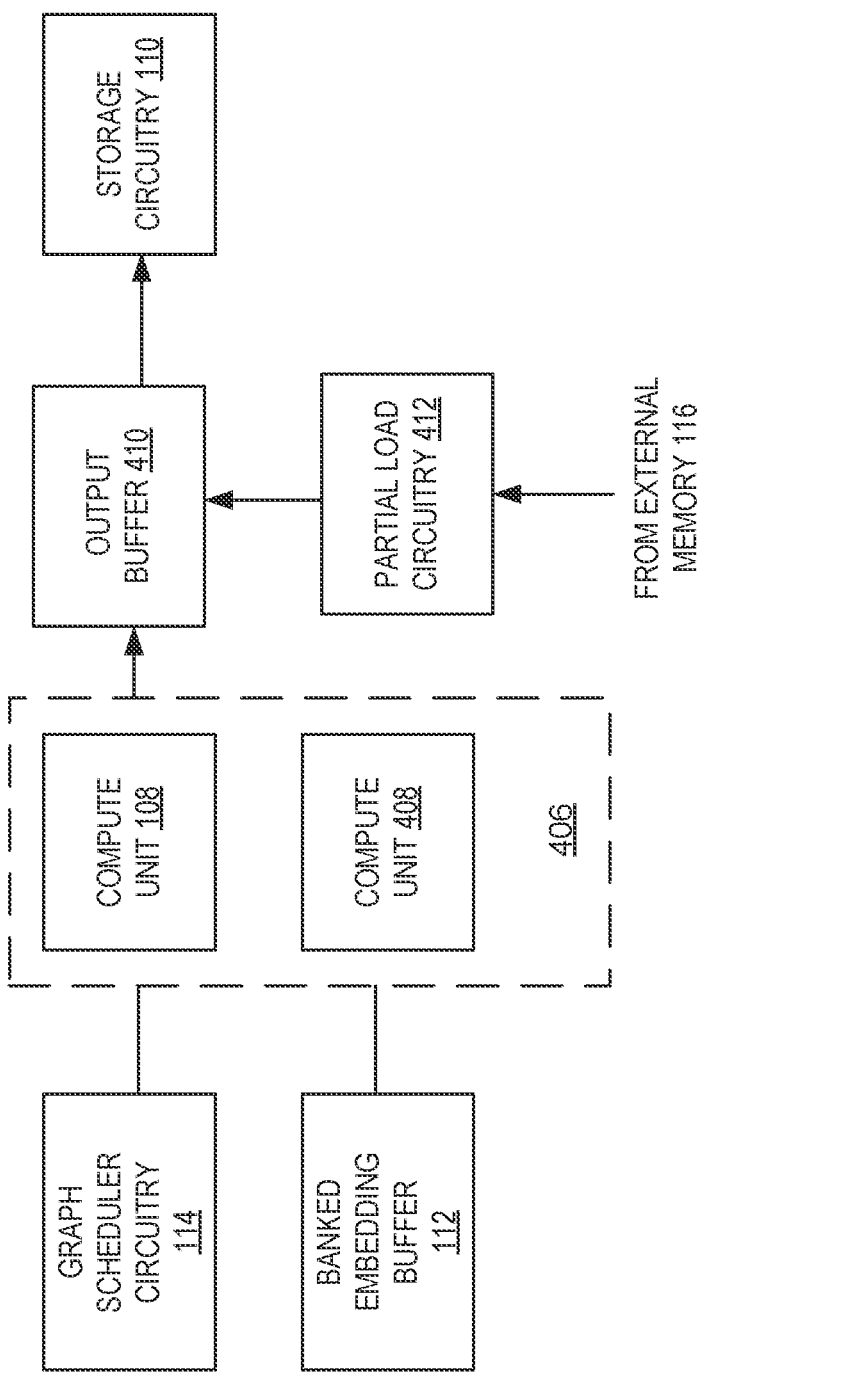
FIG. 4 is a block diagram of interconnected members of the architecture of FIG. 1.

FIG. 4 is a block diagram illustrating a portion of the architecture 100 of FIG. 1. FIG. 4 shows the example compute unit 108, the example storage circuitry 110, example graph scheduler circuitry 114, the example banked embedding buffer 112, an example plurality of compute units 406, an example second compute unit 408, an example output buffer 410, and example partial load circuitry 412.

The example graph scheduler circuitry 114 receives data (e.g., from the data retrieval circuitry 106) and provides the data to the example compute units 108 and 408.

The example plurality of compute units 406 includes the example compute unit 108 and the example compute unit 408. In some examples, more than two compute units are included in the plurality of compute units 406. Ones of the plurality of compute units 406 may receive data (e.g., a-batch data, b-batch data), perform processing operations on the received data (e.g., multiply-adds), and provide the processed data to the example output buffer 410.

In some examples, ones of the plurality of compute units 406 provide availability information to the graph scheduler circuitry 114, facilitating efficient data distribution by the graph scheduler circuitry 114. The example graph scheduler circuitry 114 will be described in more detail in association with FIGS. 9 and 10.

The example output buffer 410 retrieves data from the plurality of compute units 406 and the partial load circuitry 412. The example partial load circuitry 412 may load additional information from the external memory 116 that is not processed by the plurality of compute units 406. The output buffer 410 provides the processed data and the additional information to the example storage circuitry 110 for storage.

Figure 5:
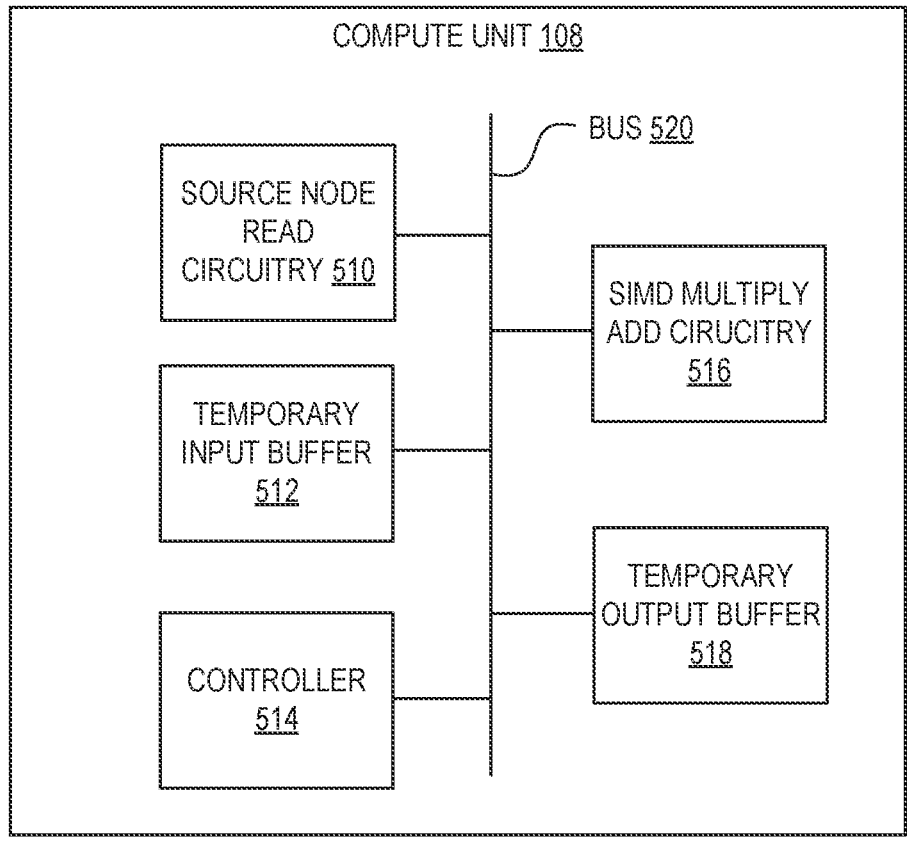
FIG. 5 is a block diagram of an example compute unit of the example architecture of FIG. 1.

FIG. 5 is a block diagram of the example compute unit 108 of FIG. 1. The example compute unit 108 includes source node read circuitry 510, a temporary input buffer 512, a controller 514, SIMD multiply add circuitry 516, and a temporary output buffer 518.

The compute unit 108 is a SIMD multiply accumulate (MAC) compute unit (e.g., an atomic unit for the architecture 100 of FIG. 1). In some examples, a plurality of compute units operates in parallel and allow for additional scalability.

The compute unit 108 performs operations on edge data within a CBT stripe. The example graph scheduler circuitry 114 of FIG. 1 assigns a specific grid region from within a CBT stripe for computation. The example compute unit 108 processes the edges within a grid region of the CBT stripe.

The example compute unit 108 includes the example source node read circuitry 510. The example source node read circuitry 510 retrieves source node data (e.g., embeddings, edge weights), and stores the data in the temporary input buffer 512.

In some examples, the controller 514 fetches source embedding data from the banked embedding buffer based on a connectivity list. The example controller 514 may also take a sequence of destination nodes and use the sequence to look ahead and pre-fetch associated data from memory external to the compute unit 108. The example controller 514 provides results of computations performed by the SIMD multiply add circuitry 516 to external memory in response to completion of compute for a given destination node.

In operation, the compute unit 108 performs operations in batches. In each batch, the compute unit retrieves b-batch embedding data and a-batch connectivity data. Responsive to receiving the data, the graph scheduler circuitry 114 of FIG. 1 assigns a logical bank of the banked embedding buffer 112 of FIG. 1 to the compute unit 108. Then, based on an allocation of banks of the banked embedding buffer 112 of FIG. 1, the compute unit 108 parses a-batch connectivity data, and the example SIMD multiply-add circuitry 516 performs SIMD multiply-add operations on edge connections of the data. In some examples, a dedicated port and bank for the compute unit 108 permits the compute unit 108 to perform an operation every clock cycle.

Figure 6:
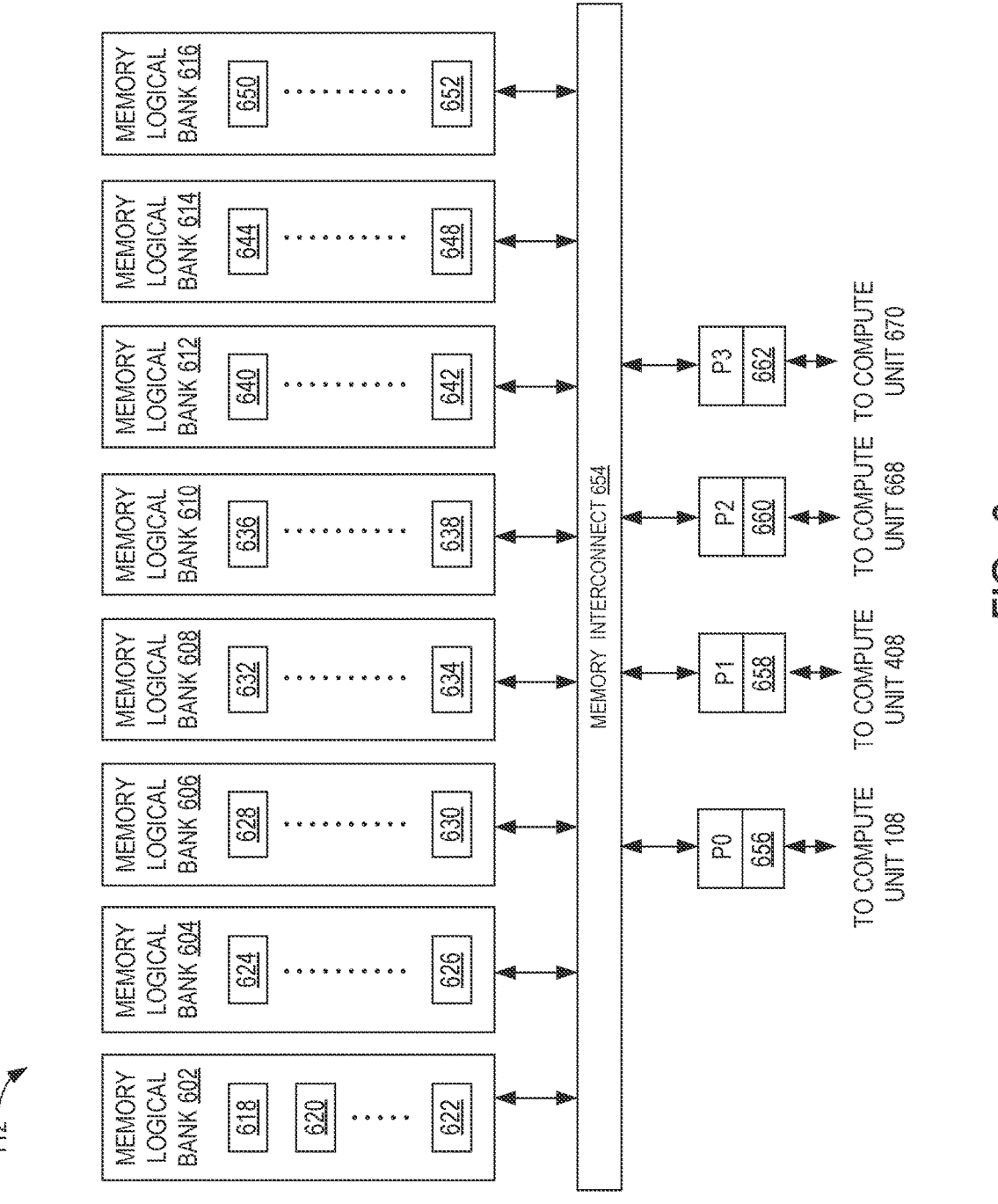
FIG. 6 is a block diagram of the example banked embedding buffer of FIG. 1.

FIG. 6 is a block diagram of the example banked embedding buffer 112 of FIG. 1. The example banked embedding buffer 112 includes memory logical banks 602-616, logical units 618-652, a memory interconnect 654, a first port 656, a second port 658, a third port 660, and a fourth port 662.

The example banked embeddings buffer 112 is split into the memory logical banks 602-616. Each memory logical bank may be further divided into two or more physical banks. In some examples, the number of logical banks is at least two times the number of compute units within a compute cluster.

Source nodes are distributed among the memory logical banks 602-616 based on mutually exclusive vertical regions. In other words, source nodes belonging to different vertical regions (e.g., different columns of a matrix representation of a graph) reside in separate logical buffers. Assignment of source nodes to separate logical banks allows for independent simultaneous access by compute units.

The example memory interconnect 654 is a memory bus that connects compute units (e.g., via their respective ports) to the memory logical banks 602-616. Embedding data of the shared source nodes may be accessed by different compute units.

The banked embeddings buffer 112 includes the ports 656-662. In some examples, a number of ports is equal to a number of compute units in the example architecture 100 of FIG. 1. Such a design allows each compute unit to access a logical bank in the example banked embeddings buffer 112 though a dedicated port. Through dedicated ports, the example graph scheduler circuitry 114 can direct read requests to mutually exclusive logical banks.

Figure 7:
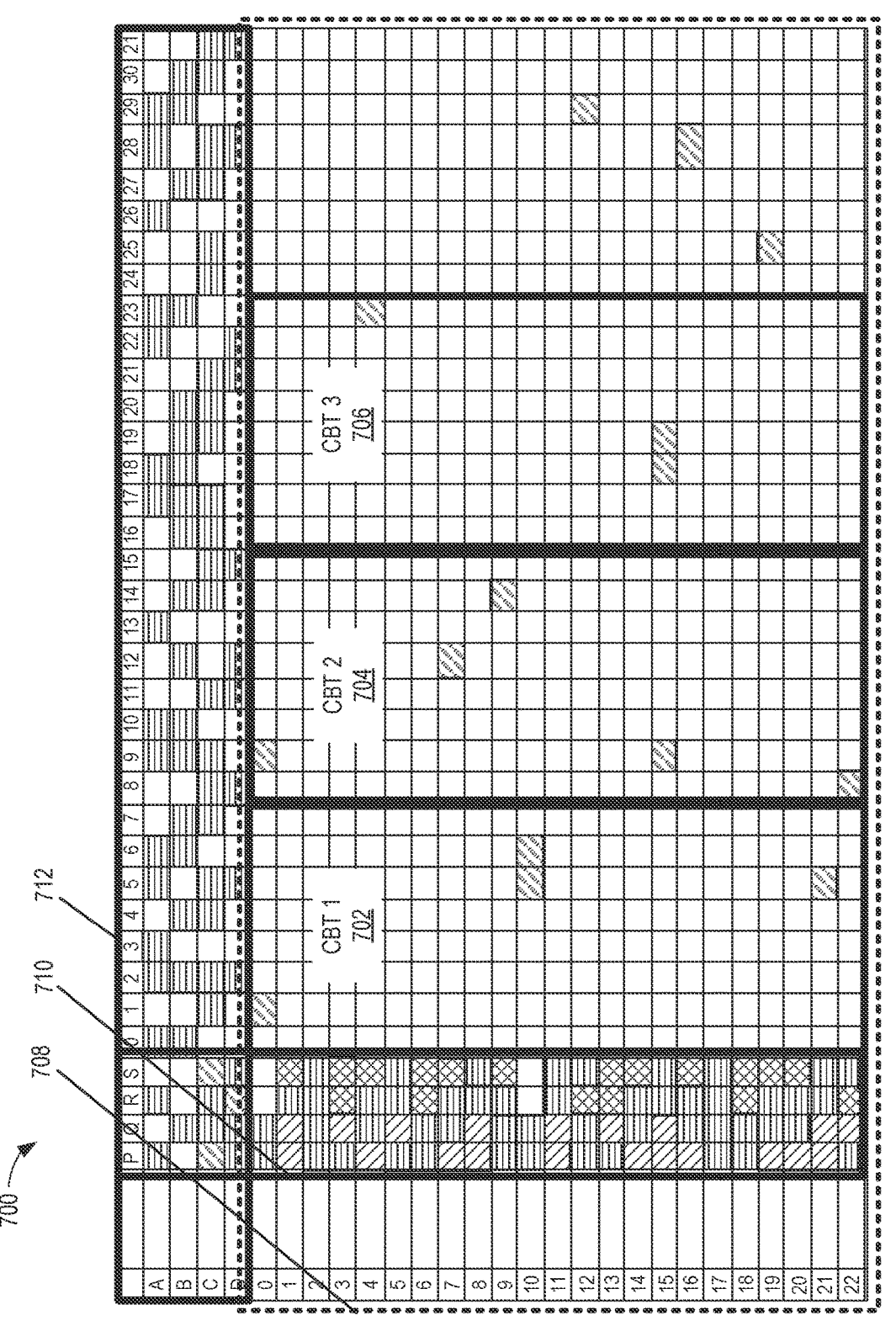
FIG. 7 is an adjacency matrix representation of a graph.

FIG. 7 illustrates a matrix representation of a sparse graph. The matrix 700 includes a first CBT 702, a second CBT 704, a third CBT 706, a first CBT stripe 708, resident source nodes 710, and resident destination nodes 712.

In the matrix, the horizontal rows represent destination nodes (e.g., A, B, C, D, 0, 1, etc.), and the vertical columns represent source nodes (P, Q, R, S, 0, 1, etc.). The matrix 700 includes the first CBT 702, the second CBT 704, and the third CBT 706. For example, the first CBT 702 includes 8 source nodes (e.g., source nodes 0 to 7). The matrix 700 includes the CBT stripe 708, which extends along the first CBT 702, the second CBT 704, and the third CBT 706. A CBT stripe is a set of CBTs in a row belonging to a common range of destination nodes (e.g., the CBT stripe 708 includes destination nodes 0 to 22).

Some graphs have nodes with high degree (e.g., outlier nodes). Graphs may also have nodes of lesser degree (e.g., inlier nodes). In the example of FIG. 7, outlier nodes may be stored and/or loaded in a first external memory, while inlier nodes are swapped in/out from a second external memory, the second external memory different from the first external memory (e.g., different memory locations, different memory types, etc.). As described herein, outlier destination nodes connected to a high number of source nodes are called resident destination nodes. Accordingly, outlier source nodes connected to a high number of destination nodes are called resident source nodes. The matrix 700 illustrates the resident destination nodes 712 (e.g., A, B, C, and D), which are connected to relatively more source nodes than other destination nodes in the matrix 700. The matrix 700 also illustrates the resident source nodes 710 (e.g., P, Q, R, and S), which are connected to relatively more destination nodes than other source nodes in the matrix 700.

The example architecture 100 of FIG. 1 determines boundaries that allocate outlier and inlier source nodes for grouping into a CBT batch. In some examples, resident source nodes are interspersed among resident destination nodes in a CBT batch. In some examples, the resident destination nodes are interspersed between CBT stripes to allow re-use of source nodes. In some examples, cumulative data fetch cycles and compute cycles are monitored. If a difference between the data fetch cycles and the compute cycles is greater than a threshold, additional outlier source nodes may be interspersed in a CBT batch. In some examples, resident nodes are ordered by degree in memory.

While a compute unit proceeds through a CBT stripe, resident source nodes are populated into external memory. In some examples, resident source nodes may be fetched from the external memory with a handshake to confirm the external memory is available.

Figure 8:
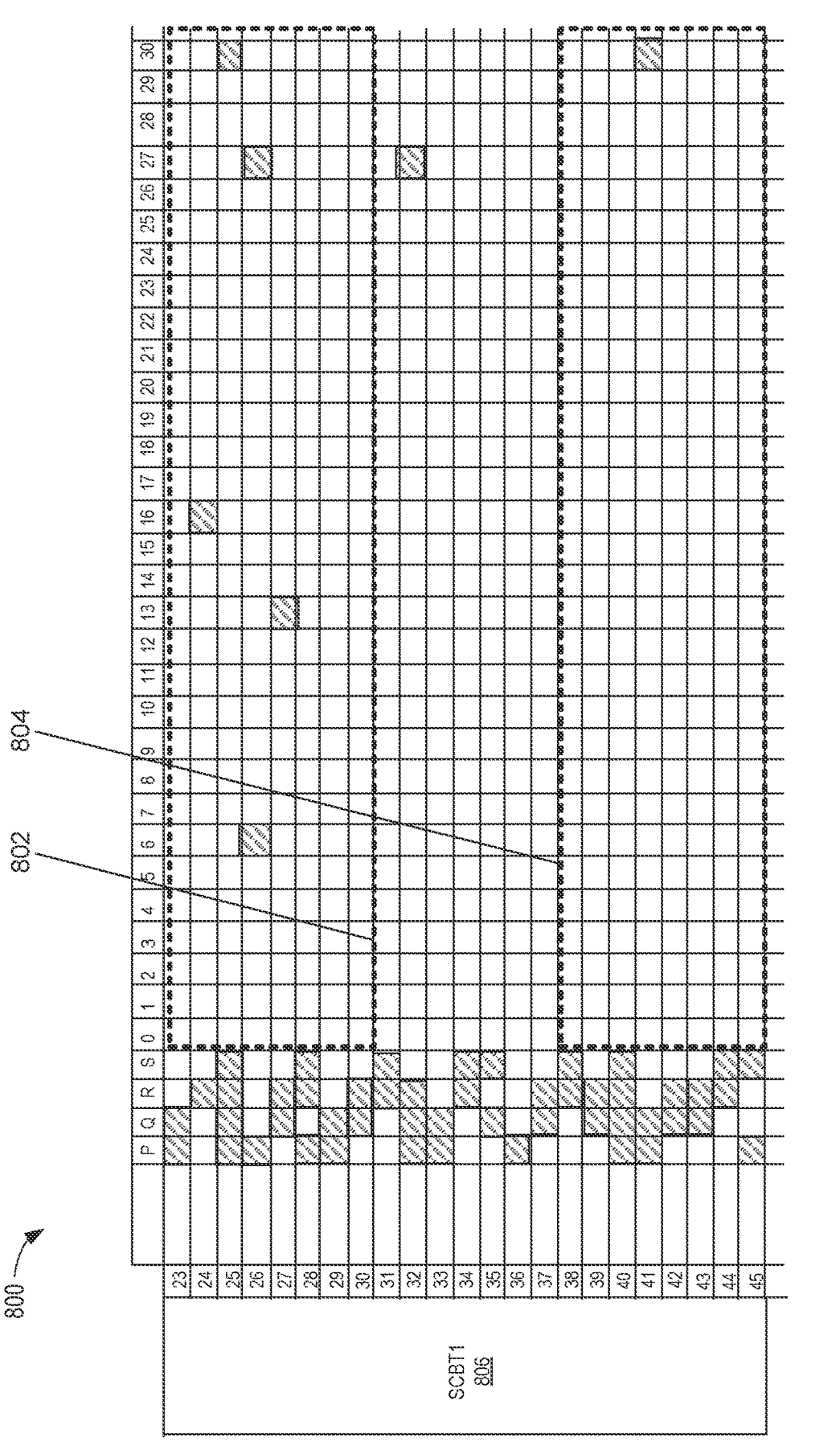
FIG. 8 is another portion of the adjacency matrix shown in FIG. 7.

FIG. 8 illustrates a matrix 800 including an example SCBT 806, an example first SCU 802, and an example second SCU 804. The first SCU 802 and the second SCU 804 include a subset of destination nodes of the SCBT 806. In some examples, the example first SCU 802 and the example second SCU 804 can be assigned to different compute units.

FIG. 9 is a second matrix 900 that is split in preparation for computation. Source nodes and destination nodes are assigned into CBT stripes and vertical slots. The example second matrix 900 includes an example first compute unit assignment 902, an example second compute unit assignment 904, an example first vertical slot 906, and an example second vertical slot 908. The example compute unit assignments 902 and 904 are each associated with one compute unit. Source nodes for a compute unit are grouped into disjoint vertical regions (e.g., the vertical slot 906, the vertical slot 908). In the example second matrix 900, each region (e.g., the region 910) may have a varying number of edges to be computed. However, since SCUs are degree balanced, a total number of compute edges (e.g., edges in all horizontal regions belonging to a compute unit) is balanced between compute units. Compute units can operate on different grid regions within a stripe in any order. In some examples compute units complete compute on all the grid regions of an assigned stripe.

Figure 10:
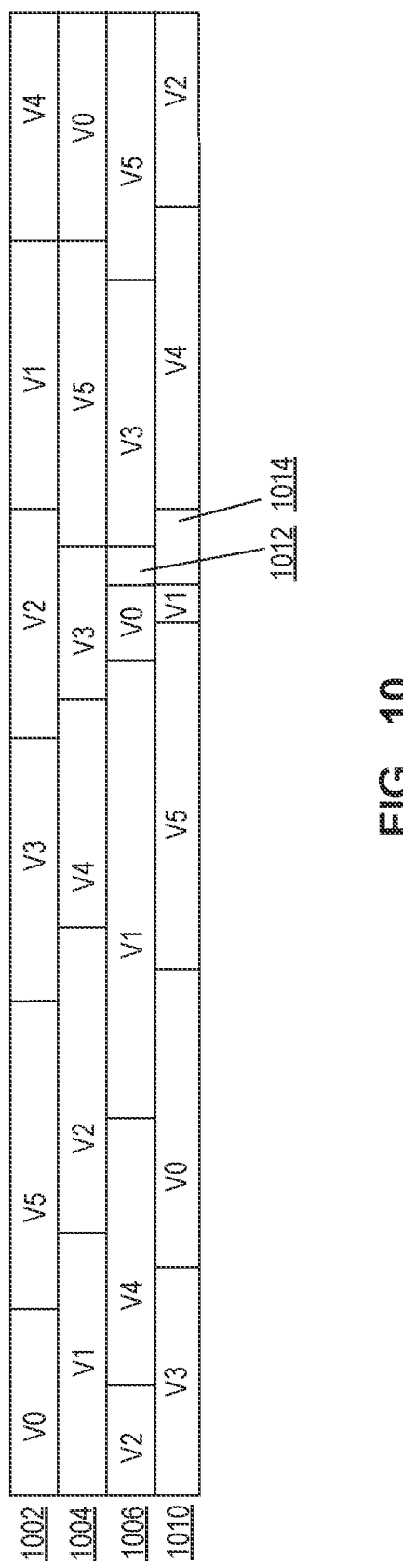
FIG. 10 is an illustration of dynamic queuing and rescheduling of compute units.

FIG. 10 is an illustration of an example schedule 1000 for dynamic queuing and rescheduling of a plurality of compute units. FIG. 10 also includes a first compute unit 1002, a second compute unit 1004, a third compute unit 1006, and a fourth compute unit 1010. The example schedule 1000 is generated by the example graph scheduler circuitry 114 of FIG. 1, which assigns vertical regions to various compute units at various times.

In some examples, compute units are assigned to vertical regions within a stripe (e.g., corresponding to a bank in a banked embedding buffer) based on the following:

First time slot: start with a least numbered compute unit (e.g., the first compute unit 1002) and assign a least numbered vertical grid element (e.g., V0) to the least numbered compute unit. The least numbered compute unit operates on edges in the least numbered vertical grid element. Compute units are assigned a grid region to operate such that they get vertically disjoint regions. In FIG. 10, compute units 1002 to 1010 start to operate upon vertical regions V0 to V3, respectively, at the first time slot.

Second time slot: compute units operate independently and access mutually exclusive source node embeddings. The number of edges may be different in various grid regions. Therefore, compute units complete operations at varying times. Upon completion of operations in an assigned grid region, compute units 1002-1010 move to the next available grid region within the same set of destination nodes (e.g., horizontally). For example, the first compute unit 1002 moves to V5 in the second timeslot while the second compute unit 1004 moves to V2 in the second timeslot.

Availability of a region for a compute unit may be determined based on whether a second compute unit is operating in the same vertical region (e.g., not available), and if the compute unit has completed executing edges in a given region.

The example schedule 1000 illustrates scheduling for the example compute units 1002-1010. In some examples, to select a next grid region for a compute unit, compute units alternate between selection of a nearest available slot and a farthest available slot.

The schedule 1000 also includes a first dead zone 1012 and a second dead zone 1014. The first and second dead zones are areas in which no data (e.g., tile region) is available for assignment to a compute unit. Dead zones can be reduced by increasing a number of banks in a banked embedding buffer.

In some examples, the example architecture 100 includes means for loading graph connectivity data and associated edge weights into the banked embedding buffer 112. For example, the means for loading may be implemented by the example tile load circuitry 104. In some examples, the tile load circuitry 104 may be instantiated by processor circuitry such as the example processor circuitry 1612 of FIG. 16. For instance, the tile load circuitry 104 may be instantiated by the example general purpose processor circuitry 1700 of FIG. 17 executing machine executable instructions such as that implemented by at least block 1102 of FIG. 11. In some examples, the example tile load circuitry 104 may be instantiated by hardware logic circuitry, which may be implemented by an ASIC or the FPGA circuitry 1700 of FIG. 17 structured to perform operations corresponding to the machine readable instructions. Additionally or alternatively, the example tile load circuitry 104 may be instantiated by any other combination of hardware, software, and/or firmware. For example, the example tile load circuitry 104 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example architecture 100 includes means for retrieving source node embeddings retrieved by source node ID from the external memory 116. For example, the means for retrieving may be implemented by the example data retrieval circuitry 106. In some examples, the data retrieval circuitry 106 may be instantiated by processor circuitry such as the example processor circuitry 1612 of FIG. 16. For instance, the data retrieval circuitry 106 may be instantiated by the example general purpose processor circuitry 1700 of FIG. 17 executing machine executable instructions such as that implemented by at least block 1104 of FIG. 11. In some examples, the example tile load circuitry 104 may be instantiated by hardware logic circuitry, which may be implemented by an ASIC or the FPGA circuitry 1700 of FIG. 17 structured to perform operations corresponding to the machine readable instructions. Additionally or alternatively, the example tile load circuitry 104 may be instantiated by any other combination of hardware, software, and/or firmware. For example, the example tile load circuitry 104 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example architecture 100 includes means for computing multiply add operations on a-batch and/or b-batch data retrieved from the data retrieval circuitry 106. For example, the means for computing may be implemented by the example compute unit 108. In some examples, the example compute unit 108 may be instantiated by processor circuitry such as the example processor circuitry 1612 of FIG. 16. For instance, the example compute unit 108 may be instantiated by the example general purpose processor circuitry 1700 of FIG. 17 executing machine executable instructions such as that implemented by at least block 1104 of FIG. 11. In some examples, the example compute unit 108 may be instantiated by hardware logic circuitry, which may be implemented by an ASIC or the FPGA circuitry 1700 of FIG. 17 structured to perform operations corresponding to the machine readable instructions. Additionally or alternatively, the example compute unit 108 may be instantiated by any other combination of hardware, software, and/or firmware. For example, the example compute unit 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example architecture 100 includes means for storing b-batch data that is provided to the example compute circuitry 102. For example, the means for storing may be implemented by the example banked embedding buffer 112. In some examples, the example banked embedding buffer 112 may be instantiated by processor circuitry such as the example processor circuitry 1612 of FIG. 16. For instance, the example banked embedding buffer 112 may be instantiated by the example general purpose processor circuitry 1700 of FIG. 17 executing machine executable instructions such as that implemented by at least block 1208 of FIG. 12. In some examples, the example banked embedding buffer 112 may be instantiated by hardware logic circuitry, which may be implemented by an ASIC or the FPGA circuitry 1700 of FIG. 17 structured to perform operations corresponding to the machine readable instructions. Additionally or alternatively, the example banked embedding buffer 112 may be instantiated by any other combination of hardware, software, and/or firmware. For example, the example banked embedding buffer 112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example architecture 100 includes means for assigning banks of the banked embedding buffer 112 to the compute unit 108 and/or another compute unit of the compute circuitry 102 based on compute unit availability. For example, the means for assigning may be implemented by the example graph scheduler circuitry 114. In some examples, the graph scheduler circuitry 114 may be instantiated by processor circuitry such as the example processor circuitry 1612 of FIG. 16. For instance, the example graph scheduler circuitry 114 may be instantiated by the example general purpose processor circuitry 1700 of FIG. 17 executing machine executable instructions such as that implemented by at least block 1306 of FIG. 13. In some examples, the example graph scheduler circuitry 114 may be instantiated by hardware logic circuitry, which may be implemented by an ASIC or the FPGA circuitry 1700 of FIG. 17 structured to perform operations corresponding to the machine readable instructions. Additionally or alternatively, the example graph scheduler circuitry 114 may be instantiated by any other combination of hardware, software, and/or firmware. For example, the example graph scheduler circuitry 114 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the architecture 100 of FIG. 1 is illustrated in FIGS. 2-10, one or more of the elements, processes, and/or devices illustrated in FIGS. 2-10 may be combined, divided, re-arranged, omitted, eliminated, and/or implemented in any other way. Further, the example compute circuitry 102, the example tile load circuitry 104, the example data retrieval circuitry 106, the example compute unit 108, the example storage circuitry 110, the example banked embedding buffer 112, the example graph scheduler circuitry 114, the example external memory 116, and/or the example architecture 100 of FIG. 1, may be implemented by hardware alone or by hardware in combination with software and/or firmware. Thus, for example, any of the example compute circuitry 102, the example tile load circuitry 104, the example data retrieval circuitry 106, the example compute unit 108, the example storage circuitry 110, the example banked embedding buffer 112, the example graph scheduler circuitry 114, the example external memory 116, and/or the example architecture 100, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example architecture 100 of FIG. 1 may include one or more elements, processes, and/or devices in addition to, or instead of, those illustrated in FIGS. 2-10, and/or may include more than one of any or all of the illustrated elements, processes and devices.

Flowcharts representative of example hardware logic circuitry, machine readable instructions, hardware implemented state machines, and/or any combination thereof for implementing the architecture 100 of FIG. 1 are shown in FIGS. 11-14. The machine readable instructions may be one or more executable programs or portion(s) of an executable program for execution by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11-14, many other methods of implementing the example architecture 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 11-14 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 11:
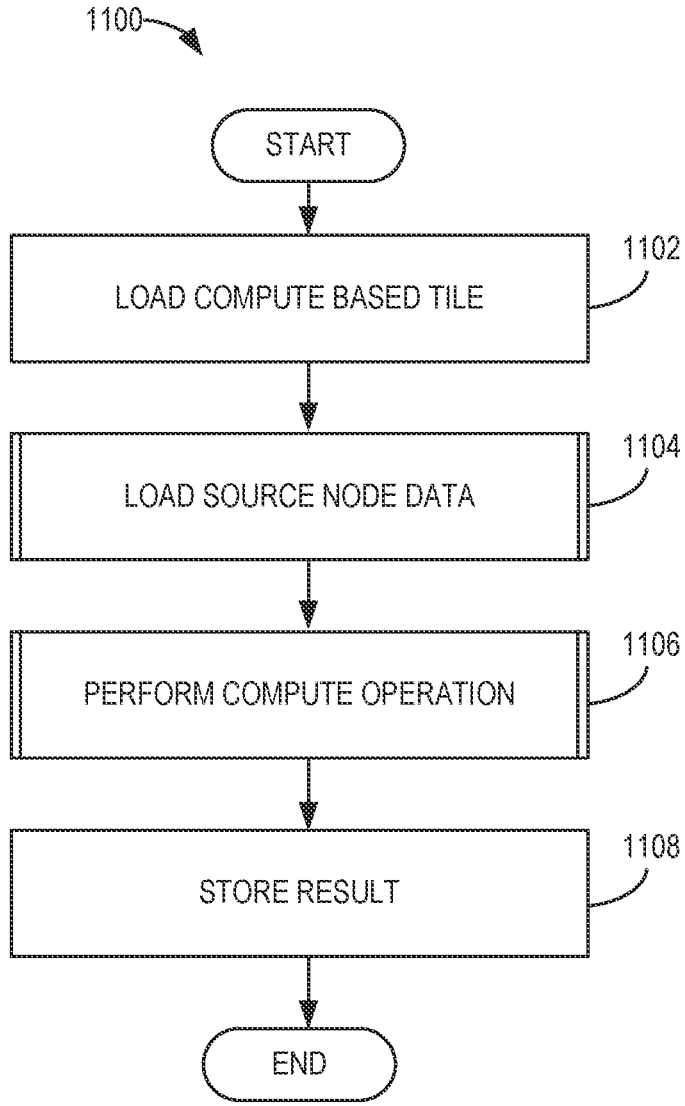
FIG. 11 is a flowchart representative of example machine readable instructions and/or example operations that may be executed by example processor circuitry to implement the example architecture of FIG. 1.

FIG. 11 is a flowchart representative of example machine readable instructions and/or example operations 1100 that may be executed and/or instantiated by processor circuitry to process web-scale graphs. The machine readable instructions and/or the operations 1100 of FIG. 11 begin at block 1102, at which the tile load circuitry 104 of FIG. 1 loads a compute based tile. At block 1104, the example data retrieval circuitry 106 of FIG. 1 loads source node data. Block 1104 will be described further in association with FIG. 12.

At block 1106, the example compute unit 108 of FIG. 1 performs a compute operation. Block 1106 will be described further in association with FIGS. 13-14. At block 1108 the example storage circuitry 110 stores results of the compute operations. The instructions 1100 end.

Figure 12:
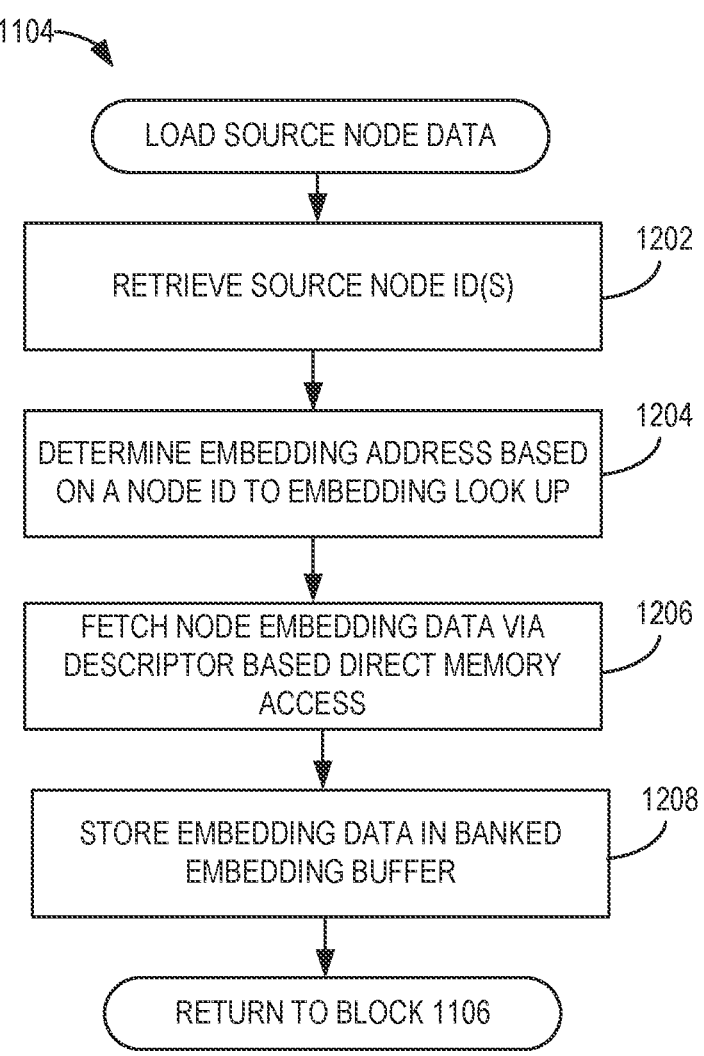
FIG. 12 is a flowchart representative of example machine readable instructions and/or example operations that may be executed by example processor circuitry to implement the example tile load circuitry of FIG. 1.

FIG. 12 is a flowchart representative of example machine readable instructions and/or example operations 1104 that may be executed and/or instantiated by processor circuitry to load source node data. At block 1202, the example CBT load circuitry 202 of FIG. 2 retrieves source node ID(s) from the example tile load circuitry 104 of FIG. 1. Next, at block 1204, the example data retrieval circuitry 106 of FIG. 1 determines an embedding address in external memory based on a node ID to embedding lookup. At block 1206, the example data retrieval circuitry 106 of FIG. 1 fetches node embedding data via a descriptor based direct memory address. At block 1208, the example data retrieval circuitry 106 of FIG. 1 stores embedding data in the banked embedding buffer circuitry 112 of FIG. 1. The instructions continue at block 1106 of FIG. 11.

Figure 13:
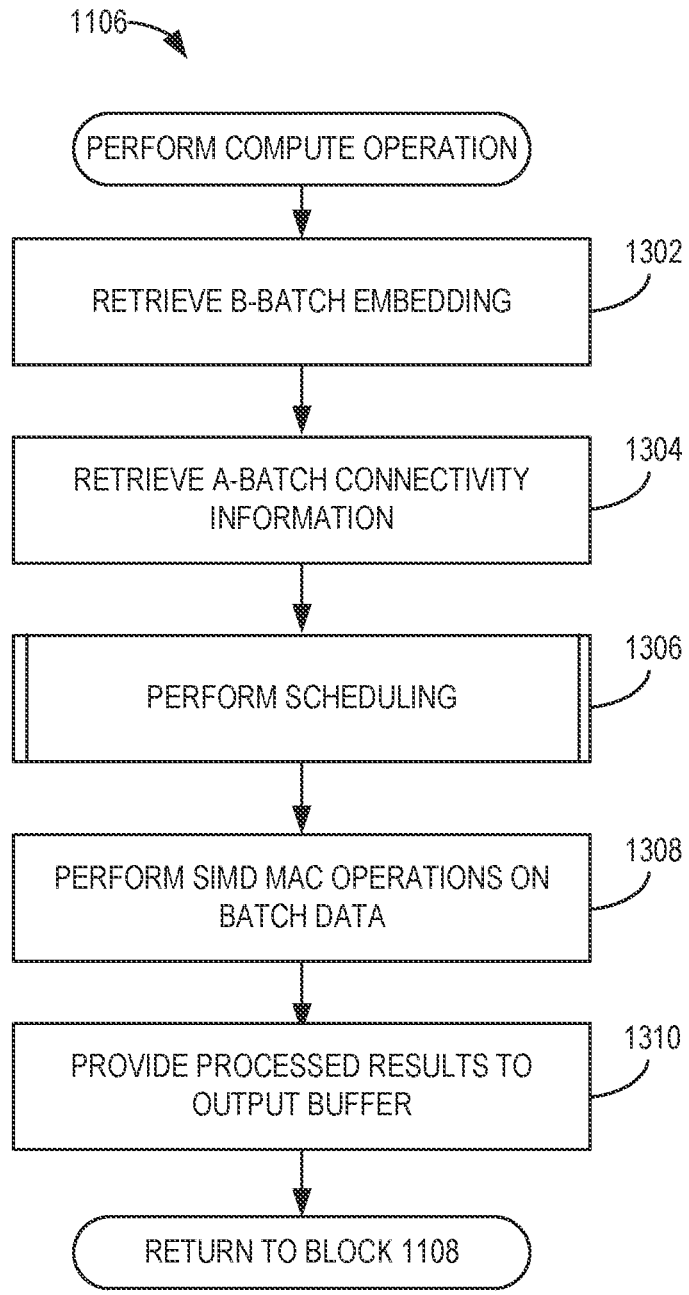
FIG. 13 is a flowchart representative of example machine readable instructions and/or example operations that may be executed by example processor circuitry to implement the example compute unit of FIG. 1.

FIG. 13 is a flowchart representative of example machine readable instructions and/or example operations 1106 that may be executed and/or instantiated by processor circuitry to perform a compute operation on graph data. The instructions 1106 begin at block 1302, at which the example compute unit 108 of FIG. 1 retrieves b-batch embedding data from the example data retrieval circuitry 106 of FIG. 1. At block 1304, the example compute unit retrieves a-batch connectivity information from the example data retrieval circuitry 106 of FIG. 1. Next, at block 1306, the example graph scheduling circuitry 114 of FIG. 1 performs scheduling. The operations of block 1306 will be described in further detail in association with FIG. 14.

At block 1308, the example compute unit 108 of FIG. 1 performs a SIMD MAC operation on the a-batch data and the b-batch data. The instructions continue at block 1310, at which the example compute unit 108 of FIG. 1 provides processed results to the temporary output buffer 518 of FIG. 5. The instructions continue at block 1108.

Figure 14:
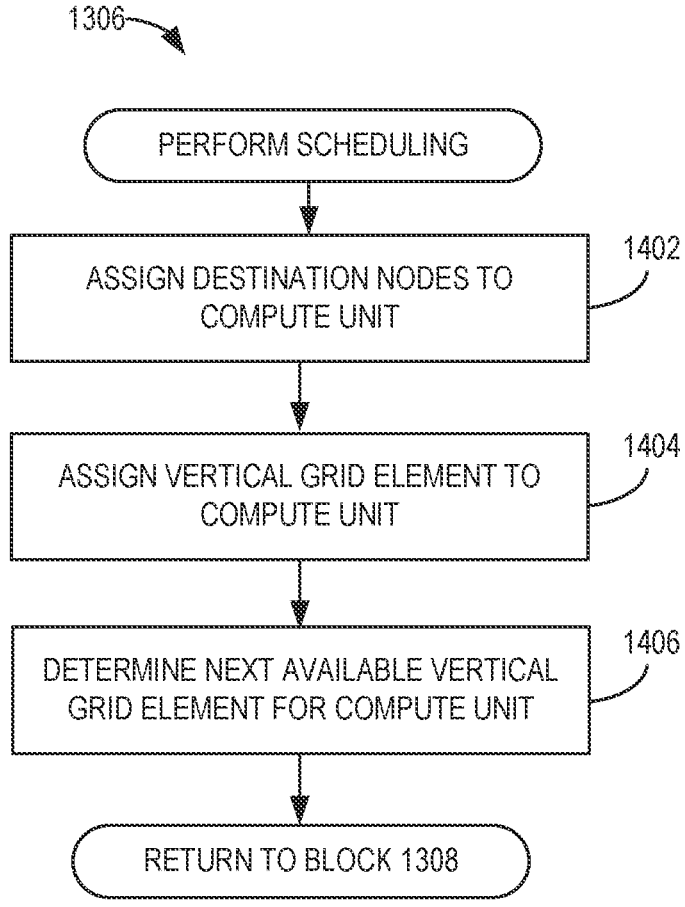
FIG. 14 is a flowchart representative of example machine readable instructions and/or example operations that may be executed by example processor circuitry to implement the example graph scheduler circuitry of FIG. 1.

FIG. 14 is a flowchart representative of example machine readable instructions and/or example operations 1306 that may be executed and/or instantiated by processor circuitry to perform scheduling on graph data. The instructions 1306 start at block 1402, at which the example graph scheduler circuitry 114 of FIG. 1 assigns destination nodes to a compute unit. At block 1404, the example graph scheduler circuitry 114 of FIG. 1 assigns a vertical grid element to the compute unit. Next, at block 1406, the example graph scheduler circuitry determines a next available vertical grid element for the compute unit. The instructions continue at block 1308.

FIG. 15 is an example table 1500 illustrating improvements in compute device operation in an example system designed in accordance with the techniques disclosed herein. The table 1500 includes run times of aggregation operations performed on various graph datasets. The table 1500 indicates that some examples disclosed herein are 87 times more effective than conventional graph processing hardware.

Figure 16:
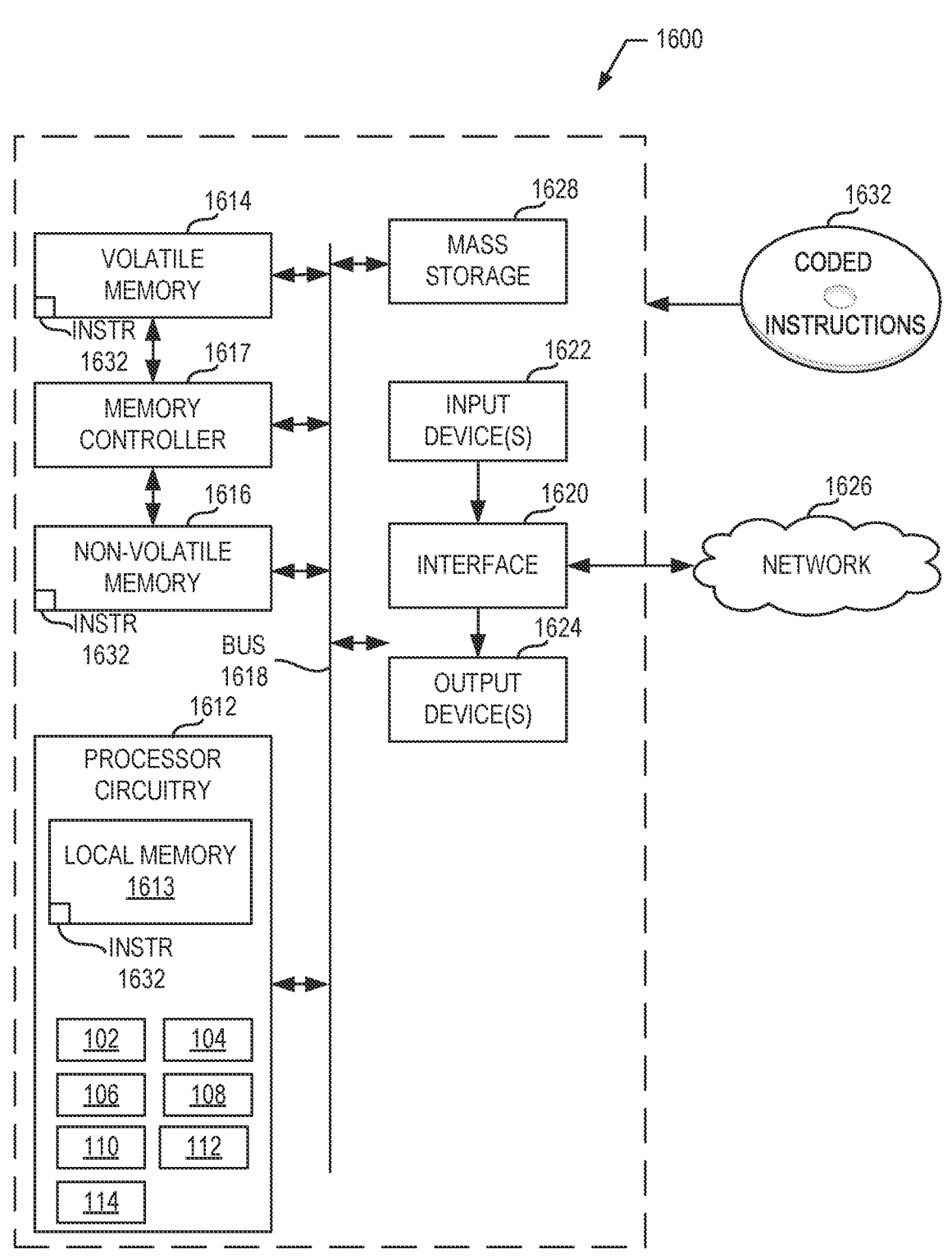
FIG. 16 is a block diagram of an example processing platform including processor circuitry structured to execute the example machine readable instructions and/or the example operations of FIGS. 11-14 to implement the architecture of FIG. 1.

FIG. 16 is a block diagram of an example processor platform 1600 structured to execute and/or instantiate the machine readable instructions and/or the operations of FIGS. 11-14 to implement the architecture 100 of FIG. 1. The processor platform 1600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the example compute circuitry 102, example tile load circuitry 104, the example compute unit 108, example data retrieval circuitry 106, the example storage circuitry 110, the example banked embedding buffer 112, the example graph scheduler circuitry 114, and the example external memory 116.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output device(s) 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1632, which may be implemented by the machine readable instructions of FIGS. 11-14, may be stored in the mass storage device 1628, in the volatile memory 1614, in the non-volatile memory 1616, and/or on a removable non-transitory computer readable storage medium such as a CD or DVD.

Figure 17:
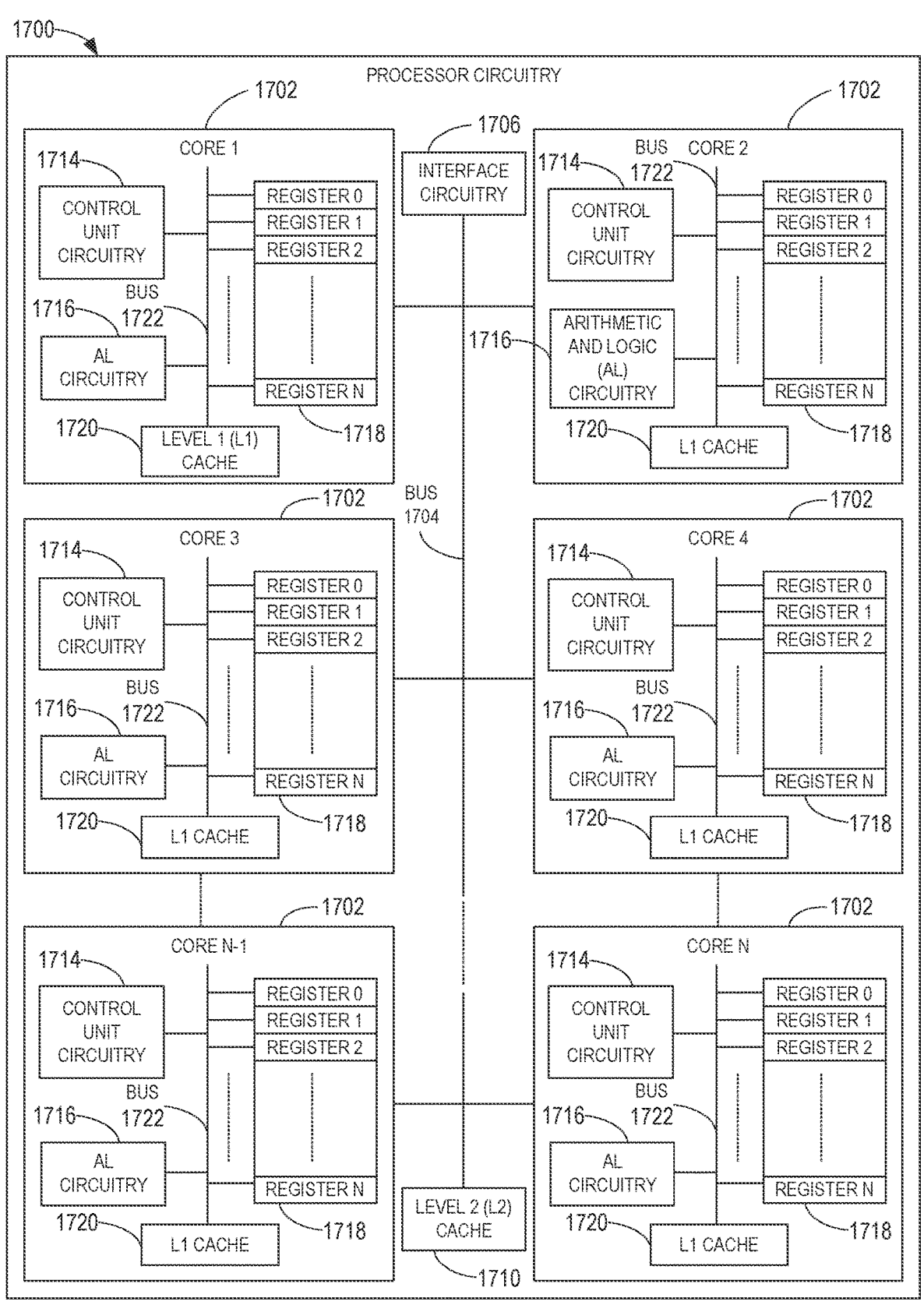
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a general purpose microprocessor 1700. The general purpose microprocessor circuitry 1700 executes some or all of the machine readable instructions of the flowchart of FIGS. 11-14 to effectively instantiate the circuitry of FIGS. 1-10 as logic circuits to perform the operations corresponding to those machine readable instructions. In some such examples, the circuitry of FIGS. 1-10 is instantiated by the hardware circuits of the microprocessor 1700 in combination with the instructions. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowcharts of FIGS. 11-14.

The cores 1702 may communicate by a first example bus 1704. In some examples, the first bus 1704 may implement a communication bus to effectuate communication associated with one(s) of the cores 1702. For example, the first bus 1704 may implement at least one of an Inter-Integrated Circuit (I2C) bus, a Serial Peripheral Interface (SPI) bus, a PCI bus, or a PCIe bus. Additionally or alternatively, the first bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and a second example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1722 may implement at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
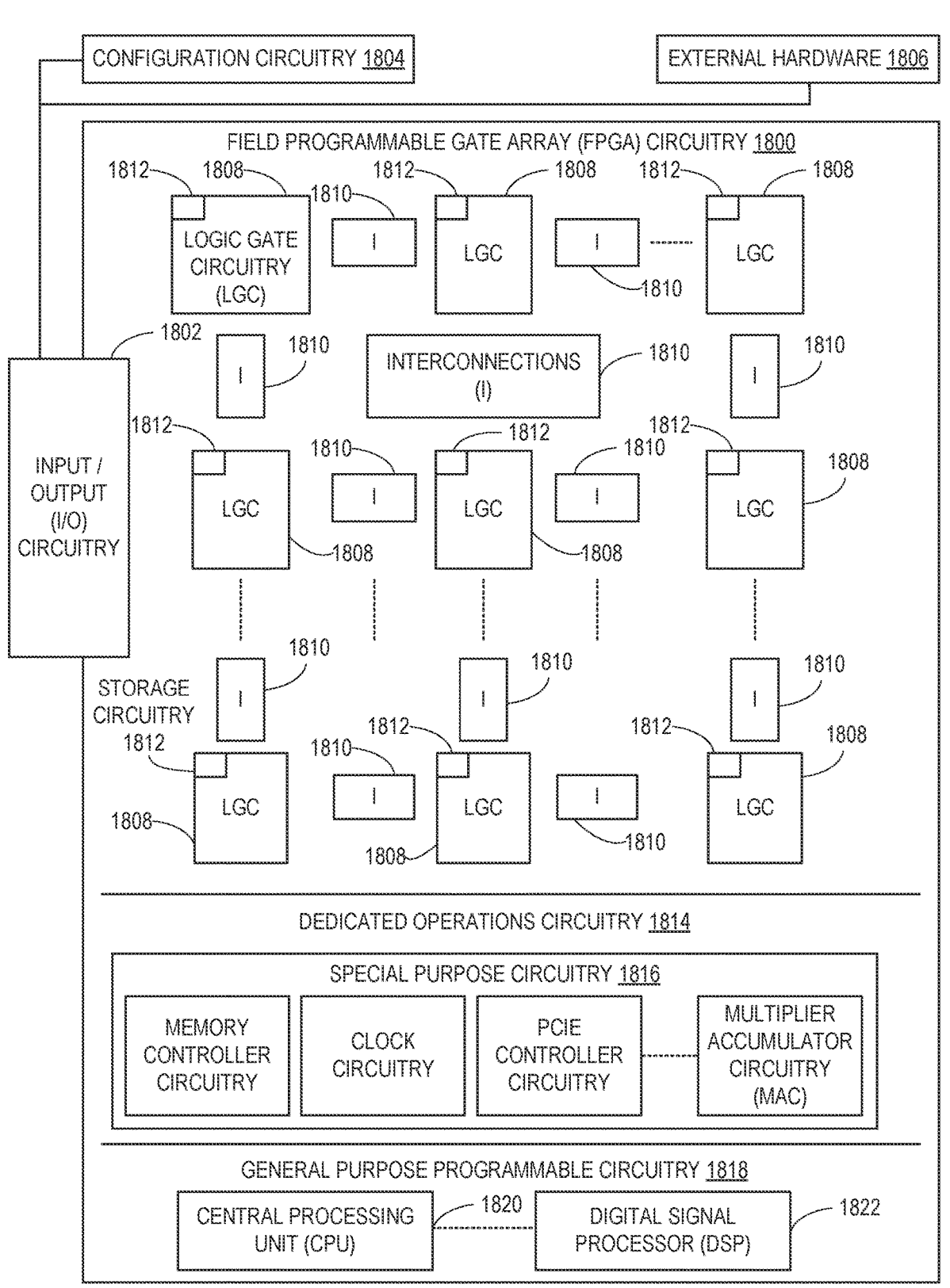
FIG. 18 is a block diagram of another example implementation of the processor circuitry of FIG. 17.

FIG. 18 is a block diagram of another example implementation of the processor circuitry 1612 of FIG. 16. In this example, the processor circuitry 1612 is implemented by FPGA circuitry 1800. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowcharts of FIG. 11-14 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 11-14. In particular, the FPGA 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 11-14. As such, the FPGA circuitry 1800 may be structured to effectively instantiate some or all of the machine readable instructions of the flowcharts of FIGS. 11-14 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIGS. 11-14 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine readable instructions of FIGS. 11-14 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowcharts of FIG. 11-14 may be executed by one or more of the cores 1702 of FIG. 17, a second portion of the machine readable instructions represented by the flowcharts of FIG. 11-14 may be executed by the FPGA circuitry 1800 of FIG. 18, and/or a third portion of the machine readable instructions represented by the flowcharts of FIGS. 11-14 may be executed by an ASIC. It should be understood that some or all of the circuitry of FIGS. 1-10 may, thus, be instantiated at the same or different times. Some or all of the circuitry may be instantiated, for example, in one or more threads executing concurrently and/or in series. Moreover, in some examples, some or all of the circuitry of FIGS. 1-10 may be implemented within one or more virtual machines and/or containers executing on the microprocessor.

In some examples, the processor circuitry 1612 of FIG. 16 may be in one or more packages. For example, the processor circuitry 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Figure 19:
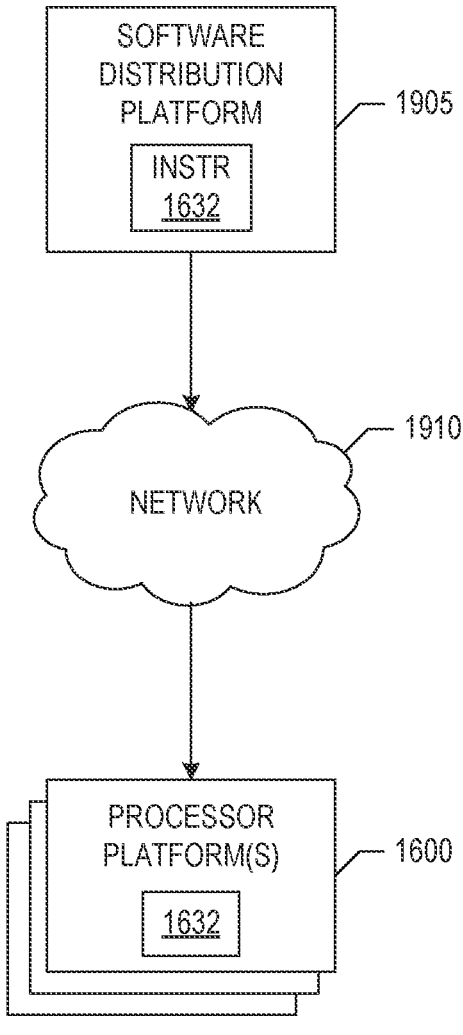
FIG. 19 is a block diagram of an example software distribution platform (e.g., one or more servers) to distribute software (e.g., software corresponding to the example machine readable instructions of FIGS. 11-14) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1905 to distribute software such as the example machine readable instructions 1632 of FIG. 16 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1632, which may correspond to the example machine readable instructions 1100 of FIGS. 11-14, as described above. The one or more servers of the example software distribution platform 1905 are in communication with a network 1910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1632 from the software distribution platform 1905. For example, the software, which may correspond to the example machine readable instructions 1100 of FIGS. 11-14, may be downloaded to the example processor platform 1600, which is to execute the machine readable instructions 1632 to implement the architecture 100. In some example, one or more servers of the software distribution platform 1905 periodically offer, transmit, and/or force updates to the software (e.g., the example machine readable instructions 1632 of FIG. 16) to ensure improvements, patches, updates, etc., are distributed and applied to the software at the end user devices.

From the foregoing, it will be appreciated that example systems, methods, apparatus, and articles of manufacture have been disclosed that process web-scale graphs. Disclosed systems, methods, apparatus, and articles of manufacture improve the efficiency of a computing device and include example architectures configured for non-uniform, graph-based data. Examples disclosed herein improve compute efficiency by allocating compute tasks to multiple compute units in a low power and highly scalable architecture. Some examples intersperse outlier nodes with inlier nodes to improve memory-bound operations.

Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to process web-scale graphs are disclosed herein. Further examples and combinations thereof include the following:

Example 1 includes an apparatus comprising at least one memory, instructions, and processor circuitry to execute the instructions to retrieve a compute based tile (CBT) from a first external memory, the CBT to include source and destination nodes of a graph, assign a stripe of the CBT to a single instruction multiple data compute unit, the stripe including a first tile and a second tile, the first tile to include first destination nodes and first source nodes, the second tile to include the first destination nodes and second source nodes, retrieve source node embeddings of the stripe based on a node identifier to source node embedding lookup, and provide the source node embeddings to the single instruction multiple data compute unit.

Example 2 includes the apparatus of example 1, wherein the processor circuitry is to execute the instructions to load graph connectivity data and associated edge weights into logical banks of a memory buffer, and assign at least one of the logical banks of the memory buffer to the single instruction multiple data compute unit.

Example 3 includes the apparatus of any of the previous examples, wherein the source node embeddings are first source node embeddings, and the processor circuitry is to execute the instructions to retrieve second source node embeddings that are of greater degree than the first source node embeddings, and interleave compute of the first source node embeddings and the second source node embeddings.

Example 4 includes the apparatus of any of the previous examples, wherein the CBT includes fewer source nodes than destination nodes.

Example 5 includes the apparatus of any of the previous examples, wherein the stripe of the CBT is a first stripe of the CBT, the single instruction multiple data (SIMD) compute unit is a first SIMD compute unit, and the processor circuitry is to execute the instructions to assign a second stripe of the CBT to a second SIMD compute unit, the first and second stripes assigned different numbers of destination nodes to balance compute between the first and second SIMD compute units.

Example 6 includes the apparatus of any of the previous examples, wherein a number of logical banks associated with the memory buffer is greater than or equal to a number of single instruction multiple data compute units.

Example 7 includes the apparatus of any of the previous examples, wherein the source node embeddings are retrieved based on a descriptor based direct memory access.

Example 8 includes a non-transitory computer readable medium comprising instructions which, when executed, cause processor circuitry to retrieve a compute based tile (CBT) from a first external memory, the CBT to include source and destination nodes of a graph, assign a stripe of the CBT to a single instruction multiple data compute unit, the stripe including a first tile and a second tile, the first tile to include first destination nodes and first source nodes, the second tile to include the first destination nodes and second source nodes, retrieve source node embeddings of the stripe based on a node identifier to source node embedding lookup, and provide the source node embeddings to the single instruction multiple data compute unit.

Example 9 includes the non-transitory computer readable medium of any of the previous examples, wherein the instructions, when executed, cause the processor circuitry to load graph connectivity data and associated edge weights into logical banks of a memory buffer, and assign at least one of the logical banks of the memory buffer to the single instruction multiple data compute unit.

Example 10 includes the non-transitory computer readable medium of any of the previous examples, wherein the source node embeddings are first source node embeddings, and the instructions, when executed, cause the processor circuitry to retrieve second source node embeddings that are of greater degree than the first source node embeddings, and interleave compute of the first source node embeddings and the second source node embeddings.

Example 11 includes the computer readable medium of any of the previous examples, wherein the CBT includes fewer source nodes than destination nodes.

Example 12 includes the computer readable medium of any of the previous examples, wherein the stripe of the CBT is a first stripe of the CBT, the single instruction multiple data (SIMD) compute unit is a first SIMD compute unit, and the processor circuitry is to execute the instructions to assign a second stripe of the CBT to a second SIMD compute unit, the first and second stripes assigned different numbers of destination nodes to balance compute between the first and second SIMD compute units.

Example 13 includes the computer readable medium of any of the previous examples, wherein a number of logical banks associated with the memory buffer is greater than or equal to a number of single instruction multiple data compute units.

Example 14 includes the computer readable medium of any of the previous examples, wherein the source node embeddings are retrieved based on a descriptor based direct memory access.

Example 15 includes a method comprising retrieving, by executing an instruction with processor circuitry, a compute based tile (CBT) from a first external memory, the CBT including source and destination nodes of a graph, assigning, by executing an instruction with the processor circuitry, a stripe of the CBT to a single instruction multiple data compute unit, the stripe including first and second tiles, the first tile and the second tile including the same destination nodes and different source nodes, retrieving, by executing an instruction with the processor circuitry, source node embeddings of the stripe based on a node identifier to source node embedding lookup, and providing, by executing an instruction with the processor circuitry, the source node embeddings to a single instruction multiple data compute unit.

Example 16 includes the method of any of the previous examples, further including loading graph connectivity data and associated edge weights into logical banks of a memory buffer, and assigning at least one of the logical banks of the memory buffer to the single instruction multiple data compute unit.

Example 17 includes the method of any of the previous examples, wherein the source node embeddings are first source node embeddings, and further including retrieving second source node embeddings that are of greater degree than the first source node embeddings, and interleaving the second source node embeddings for processing within a compute batch of the second source node embeddings.

Example 18 includes the method of any of the previous examples, wherein the CBT includes fewer source nodes than destination nodes.

Example 19 includes the method any of the previous examples, wherein the stripe of the CBT is a first stripe of the CBT, the single instruction multiple data (SIMD) compute unit is a first SIMD compute unit, and further including assigning a second stripe of the CBT to a second SIMD compute unit, wherein the first and second tiles are assigned different amounts of destination nodes to balance compute between the first and second SIMD compute units.

Example 20 includes the method of any of the previous examples, wherein a number of logical banks associated with the memory buffer is greater than or equal to a number of single instruction multiple data compute units.

Example 21 includes the method of any of the previous examples, wherein retrieving source node embeddings is based on a descriptor based direct memory access.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
instructions; and
processor circuitry to execute the instructions to:
retrieve a compute based tile (CBT) from a first external memory, the CBT to include source and destination nodes of a graph;
assign a stripe of the CBT to a single instruction multiple data compute unit, the stripe including a first tile and a second tile, the first tile to include first destination nodes and first source nodes, the second tile to include the first destination nodes and second source nodes;
retrieve source node embeddings of the stripe based on a node identifier to source node embedding lookup; and
provide the source node embeddings to the single instruction multiple data compute unit.

2. The apparatus of claim 1, wherein the processor circuitry is to execute the instructions to:
load graph connectivity data and associated edge weights into logical banks of a memory buffer; and
assign at least one of the logical banks of the memory buffer to the single instruction multiple data compute unit.

3. The apparatus of claim 1, wherein the source node embeddings are first source node embeddings, and the processor circuitry is to execute the instructions to:
retrieve second source node embeddings that are of greater degree than the first source node embeddings; and
interleave compute of the first source node embeddings and the second source node embeddings.

4. The apparatus of claim 1, wherein the CBT includes fewer source nodes than destination nodes.

5. The apparatus of claim 1, wherein the stripe of the CBT is a first stripe of the CBT, the single instruction multiple data (SIMD) compute unit is a first SIMD compute unit, and the processor circuitry is to execute the instructions to assign a second stripe of the CBT to a second SIMD compute unit, the first and second stripes assigned different numbers of destination nodes to balance compute between the first and second SIMD compute units.

6. The apparatus of claim 2, wherein a number of logical banks associated with the memory buffer is greater than or equal to a number of single instruction multiple data compute units.

7. The apparatus of claim 1, wherein the source node embeddings are retrieved based on a descriptor based direct memory access.

8. A non-transitory computer readable medium comprising instructions which, when executed, cause processor circuitry to:
retrieve a compute based tile (CBT) from a first external memory, the CBT to include source and destination nodes of a graph;
assign a stripe of the CBT to a single instruction multiple data compute unit, the stripe including a first tile and a second tile, the first tile to include first destination nodes and first source nodes, the second tile to include the first destination nodes and second source nodes;
retrieve source node embeddings of the stripe based on a node identifier to source node embedding lookup; and
provide the source node embeddings to the single instruction multiple data compute unit.

9. The non-transitory computer readable medium of claim 8, wherein the instructions, when executed, cause the processor circuitry to:

load graph connectivity data and associated edge weights into logical banks of a memory buffer; and assign at least one of the logical banks of the memory buffer to the single instruction multiple data compute unit.

10. The non-transitory computer readable medium of claim 8, wherein the source node embeddings are first source node embeddings, and the instructions, when executed, cause the processor circuitry to:

retrieve second source node embeddings that are of greater degree than the first source node embeddings; and interleave compute of the first source node embeddings and the second source node embeddings.

11. The non-transitory computer readable medium of claim 8, wherein the CBT includes fewer source nodes than destination nodes.

12. The non-transitory computer readable medium of claim 8, wherein the stripe of the CBT is a first stripe of the CBT, the single instruction multiple data (SIMD) compute unit is a first SIMD compute unit, and the processor circuitry is to execute the instructions to assign a second stripe of the CBT to a second SIMD compute unit, the first and second stripes assigned different numbers of destination nodes to balance compute between the first and second SIMD compute units.

13. The non-transitory computer readable medium of claim 9, wherein a number of logical banks associated with the memory buffer is greater than or equal to a number of single instruction multiple data compute units.

14. The non-transitory computer readable medium of claim 8, wherein the source node embeddings are retrieved based on a descriptor based direct memory access.

15. A method comprising:

retrieving, by executing an instruction with processor circuitry, a compute based tile (CBT) from a first external memory, the CBT including source and destination nodes of a graph;

assigning, by executing an instruction with the processor circuitry, a stripe of the CBT to a single instruction multiple data compute unit, the stripe including a first tile and a second tile, the first tile to include first destination nodes and first source nodes, the second tile to include the first destination nodes and second source nodes;

retrieving, by executing an instruction with the processor circuitry, source node embeddings of the stripe based on a node identifier to source node embedding lookup; and providing, by executing an instruction with the processor circuitry, the source node embeddings to the single instruction multiple data compute unit.

16. The method of claim 15, further including:

loading graph connectivity data and associated edge weights into logical banks of a memory buffer; and assigning at least one of the logical banks of the memory buffer to the single instruction multiple data compute unit.

17. The method of claim 15, wherein the source node embeddings are first source node embeddings, and further including:

retrieving second source node embeddings that are of greater degree than the first source node embeddings; and interleaving the second source node embeddings for processing within a compute batch of the second source node embeddings.

18. The method of claim 15, wherein the CBT includes fewer source nodes than destination nodes.

19. The method of claim 15, wherein the stripe of the CBT is a first stripe of the CBT, the single instruction multiple data (SIMD) compute unit is a first SIMD compute unit, and further including assigning a second stripe of the CBT to a second SIMD compute unit, wherein the first and second tiles are assigned different amounts of destination nodes to balance compute between the first and second SIMD compute units.

20. The method of claim 16, wherein a number of logical banks associated with the memory buffer is greater than or equal to a number of single instruction multiple data compute units.

21. The method of claim 15, wherein retrieving source node embeddings is based on a descriptor based direct memory access.

* * * * *